US012567803B2

(12) United States Patent
Yang et al.

(10) Patent No.: US 12,567,803 B2
(45) Date of Patent: Mar. 3, 2026

(54) CONVERSION CONTROL CIRCUIT FOR CONTROLLING A RESONANT POWER CONVERTER AND CONTROL METHOD THEREOF

(71) Applicant: Richtek Technology Corporation, Hsinchu (TW)

(72) Inventors: Ta-Yung Yang, Taoyuan (TW); Yu-Chang Chen, Nantou (TW); Kuo-Chi Liu, Hsinchu (TW); Tzu-Chen Lin, Hsinchu (TW)

(73) Assignee: Richtek Technology Corporation, Hsinchu (TW)

( * ) Notice: Subject to any disclaimer, the term of this patent is extended or adjusted under 35 U.S.C. 154(b) by 213 days.

(21) Appl. No.: 18/644,126

(22) Filed: Apr. 24, 2024

(65) Prior Publication Data

US 2025/0211100 A1 Jun. 26, 2025

Related U.S. Application Data

(60) Provisional application No. 63/613,064, filed on Dec. 21, 2023.

(51) Int. Cl.
*H02M 3/00* (2006.01)
*H02M 1/00* (2006.01)
*H02M 3/335* (2006.01)

(52) U.S. Cl.
CPC ........... *H02M 3/01* (2021.05); *H02M 1/0035* (2021.05); *H02M 1/0058* (2021.05); *H02M 3/33571* (2021.05)

(58) Field of Classification Search
CPC .... H02M 3/01; H02M 1/0035; H02M 1/0058; H02M 3/33571
See application file for complete search history.

(56) References Cited

U.S. PATENT DOCUMENTS

| | | | | |
|---|---|---|---|---|
| 2015/0357927 A1* | 12/2015 | Zhang | ............... | H02M 3/33571 363/21.02 |
| 2018/0183343 A1* | 6/2018 | Ausseresse | ......... | H02M 3/3376 |
| 2020/0007043 A1* | 1/2020 | Miao | ........................ | H02M 3/01 |
| 2022/0416676 A1* | 12/2022 | Sivakumar | .............. | H02M 3/01 |
| 2023/0136279 A1* | 5/2023 | Kuo | .................. | H02M 3/33523 363/21.02 |

* cited by examiner

*Primary Examiner* — Rafael O De Leon Domenech
(74) *Attorney, Agent, or Firm* — Huan-Yi Lin

(57) ABSTRACT

A conversion control circuit for controlling a resonant power converter which includes a high-side and a low-side transistor which are coupled to convert an input voltage into an output voltage, and a resonant circuit including at least one resonant inductor and a resonant capacitor. The conversion control circuit includes: a sensing circuit for sensing a resonant-related parameter related to the resonance produced by the resonant circuit to generate a sensed signal; and a PWM control circuit for generating a high-side and a low-side driving signal according to the sensed signal and a feedback signal related to the output voltage. When the feedback signal falls below a low-power threshold, the resonant power converter enters a burst OFF period, during which both the high-side and the low-side transistors are turned OFF. A lower limit of the burst OFF period is equal to a switching period of the high-side and the low-side driving signals.

31 Claims, 17 Drawing Sheets

CONVERSION CONTROL CIRCUIT FOR CONTROLLING A RESONANT POWER CONVERTER AND CONTROL METHOD THEREOF

CROSS REFERENCE

The present invention claims priority to U.S. 63/613,064 filed on Dec. 21, 2023.

BACKGROUND OF THE INVENTION

Field of Invention

The present invention relates to a conversion control circuit. Particularly it relates to a conversion control circuit for controlling a resonant power converter. The present invention also relates to a control method for controlling the above resonant power converter.

Description of Related Art

The resonant power converter, such as an LLC resonant power converter, is widely favored for its higher power conversion efficiency. Furthermore, the light-load efficiency and the transient response have drawn more attention in the LLC resonant converters within the information technology industry. A prior art, titled "Resonant mode power supply having an efficient low-power stand-by mode," U.S. Pat. No. 6,018,467, has been disclosed, which includes a burst mode to reduce power loss in light load and standby operations by periodically blocking the switching signals. However, the light load power consumption of this approach is still significant due to its high switching frequency under light load conditions.

Capacitor voltage control is typically the preferred solution due to its wide bandwidth, fast dynamic response, and higher efficiency at light loads. In this method, the voltage across the resonant capacitor determines the timing for the switches that control the voltage across the resonant tank and has a low switching frequency under light loads. Prior art, "Control Device for a Resonant Converter," U.S. Pat. No. 9,019,725, has previously employed resonant capacitor voltage control. However, it has a practical drawback that the DC component of the voltage across the resonant capacitor is directly related to the duty cycle and input voltage of the converter, which generates the square wave voltage across the resonant tank by operating the switches. In a 50% duty cycle operation, the DC value of the voltage across the resonant capacitor equals half of the supply voltage. This means any offset in sensing the DC component can affect the duty cycle and potentially lead to improper functioning of the resonant power converter.

FIG. 1A shows waveforms of a prior art resonant power converter operated at a 50% duty cycle. FIG. 1B shows waveforms of a prior art resonant power converter not operated at a 50% duty cycle. Displayed in FIGS. 1A and 1B are secondary side current Isecondary, cross voltage Vcr of the resonant capacitor, primary side switching signal Vsw, primary side current Iprimary and magnetizing inductance current ILM. As shown in FIG. 1B, if the resonant power converter does not operate at a 50% duty cycle, the operation results in an unbalanced current being delivered to the secondary side, which subsequently leads to worse power efficiency.

Another prior art, "Resonant converter control based on a voltage difference," U.S. Pat. No. 9,065,350, discloses a method that samples the voltage difference of the resonant capacitor. This method does not require offsetting the DC component of the resonant capacitor's voltage. However, it may face challenges in operating properly under light load conditions due to the small voltage difference.

In view of the above, to overcome the drawbacks of the prior art, the present invention proposes a method and a circuit designed to address these issues. It provides precise capacitor voltage control, including burst mode operation, for LLC resonant power converters.

SUMMARY OF THE INVENTION

From one perspective, the present invention provides a conversion control circuit configured to operably control a resonant power converter, wherein the resonant power converter includes a high-side transistor and a low-side transistor which are coupled in series sequentially between an input voltage and a ground potential to form a half-bridge circuit, and a resonant circuit including at least one resonant inductor and a resonant capacitor, wherein the high-side transistor and the low-side transistor are configured to switch the resonant circuit to convert the input voltage into an output voltage; wherein the conversion control circuit comprises: a sensing circuit configured to sense a resonant-related parameter with a resonant state to generate a sensed signal, wherein the resonant-related parameter is related to the resonance produced by the resonant circuit; and a PWM control circuit configured to operably generate a high-side driving signal and a low-side driving signal according to the sensed signal and a feedback signal, so as to control the high-side transistor and the low-side transistor respectively for switching the resonant circuit to generate the output voltage; wherein the feedback signal is related to an output power of the output voltage; wherein when the feedback signal falls below a low-power threshold, the resonant power converter enters a burst OFF period, during which both the high-side transistor and the low-side transistor are turned OFF; wherein the burst OFF period is equal to or greater than an ON period of the high-side driving signal plus an ON period of the low-side driving signal.

In one embodiment, the resonant power converter additionally enters the burst OFF period when a current-sense signal, which is related to the sensed signal, exceeds an over-current threshold.

In one embodiment, the resonant-related parameter includes one of the following: (1) a resonant voltage across the resonant capacitor; or (2) a resonant current flowing through the resonant capacitor or flowing through the at least one resonant inductor.

In one embodiment, the sensing circuit includes one of the following: (1) a differentiator circuit coupled to the resonant capacitor and configured to generate the resonant current; or (2) a DCR sensing circuit connected in parallel to one of the at least one resonant inductor and configured to generate the resonant current.

In one embodiment, the burst OFF period starts with a synchronization of the high-side transistor transitioning to a non-conductive state, and the burst OFF period ends with a synchronization of the low-side transistor transitioning to a conductive state.

In one embodiment, the burst OFF period further ends with a synchronization of a zero current point of a current-sense signal, thereby mitigating the conduction loss when the low-side transistor is turning ON; wherein the current-sense signal is related to the sensed signal; wherein when the burst OFF period ends with a synchronization of the zero current point of a current-sense signal, the burst OFF period is equal to or greater than a quasi-resonance period which is related to the synchronization of the zero current point of a current-sense signal.

In one embodiment, when the burst OFF period exceeds a timeout period threshold, the burst OFF period ends with an asynchronization of the zero current point of the current-sense signal.

In one embodiment, a duration of the burst OFF period increases as an output power of the output voltage decreases.

In one embodiment, the PWM control circuit includes: a soft-start circuit configured to enable a soft-start power-on sequence, during which the feedback signal progressively increases; wherein the PWM control circuit is configured to operably generate the high-side driving signal and the low-side driving signal further according to the sensed signal and a compensation signal, wherein the compensation signal is generated by subtracting a ramp signal from the feedback signal.

In one embodiment, the conversion control circuit further comprising a full-wave rectification circuit configured to operably offset a DC component of the sensed signal according to an offset signal, and to operably generate a rectification sensed signal by performing a full-wave rectification on the sensed signal; wherein the PWM control circuit is configured to operably generate the high-side driving signal and the low-side driving signal further according to a comparison between the rectification sensed signal and a compensation signal, wherein the compensation signal is related to the feedback signal.

In one embodiment, the full-wave rectification circuit is further configured to operably adjust a DC bias of the rectification sensed signal according to the offset signal.

In one embodiment, the offset signal is adjusted based on a difference between a duty cycle of the high-side driving signal and a duty cycle of the low-side driving signal, so as to adjust and match the duty cycle of the high-side driving signal and the duty cycle of the low-side driving signal.

In one embodiment, the offset signal includes a bias voltage, which is generated by a resistive voltage divider connected to the input voltage.

In one embodiment, the conversion control circuit further comprising a tuning circuit configured to adjust a duty cycle of the high-side driving signal to match a duty cycle of the low-side driving signal, or to adjust the duty cycle of the low-side driving signal to match the duty cycle of the high-side driving signal.

In one embodiment, the PWM control circuit further configured to generate a phase signal, which is set and enabled in response to a crossover signal, wherein the crossover signal is generated when the rectification sensed signal falls below a low-voltage threshold; wherein the phase signal is reset and disabled when the rectification sensed signal exceeds the compensation signal.

In one embodiment, when the high-side driving signal is turned on and the phase signal is enabled, the high-side driving signal is turned off if the rectification sensed signal crosses the compensation signal, and after a first dead-time, the low-side driving signal is turned on; wherein when the low-side driving signal is turned on and the phase signal is enabled, the low-side driving signal is turned off if the rectification sensed signal crosses the compensation signal, and after a second dead-time, the high-side driving signal is turned on.

In one embodiment, the pulse width of the high-side driving signal and the low-side driving signal is limited by a maximum on-time, so as to constrains a switching-cycle time to be shorter than a resonant period of the resonant circuit, wherein the switching-cycle time includes an ON period and an OFF period of the high-side driving signal or of the low-side driving signal.

In one embodiment, when the input voltage is lower than a low-voltage threshold and the output power is higher than a heavy-load threshold, the maximum on-time is lengthened, such that a switching-cycle time is optionally longer than a resonant period of the resonant circuit, wherein the switching-cycle time includes an ON period and an OFF period of the high-side driving signal or of the low-side driving signal.

From another perspective, the present invention provides a conversion control circuit configured to operably control a resonant power converter, wherein the resonant power converter includes a high-side transistor and a low-side transistor which are coupled in series sequentially between an input voltage and a ground potential to form a half-bridge circuit, and a resonant circuit including at least one resonant inductor and a resonant capacitor, wherein the high-side transistor and the low-side transistor are configured to switch the resonant circuit to convert the input voltage into an output voltage; wherein the conversion control circuit comprises: a sensing circuit configured to sense a resonant-related parameter with a resonant state to generate a sensed signal, wherein the resonant-related parameter is related to the resonance produced by the resonant circuit; a PWM control circuit configured to operably generate a high-side driving signal and a low-side driving signal according to the sensed signal and a feedback signal, so as to control the high-side transistor and the low-side transistor respectively for switching the resonant circuit to generate the output voltage; wherein the feedback signal is related to an output power of the output voltage; and a full-wave rectification circuit configured to operably offset a DC component of the sensed signal according to an offset signal, and to operably generate a rectification sensed signal by performing a full-wave rectification on the sensed signal; wherein the PWM control circuit is configured to operably generate the high-side driving signal and the low-side driving signal further according to a comparison between the rectification sensed signal and a compensation signal, wherein the compensation signal is related to the feedback signal.

From another perspective, the present invention provides a control method configured to operably control a resonant power converter, wherein the resonant power converter includes a high-side transistor and a low-side transistor which are coupled in series sequentially between an input voltage and a ground potential to form a half-bridge circuit, and a resonant circuit including at least one resonant inductor and a resonant capacitor, wherein the high-side transistor and the low-side transistor are configured to switch the resonant circuit to convert the input voltage into an output voltage; wherein the control method comprises: sensing a resonant-related parameter with a resonant state to generate a sensed signal, wherein the resonant-related parameter is related to the resonance produced by the resonant circuit; generating a high-side driving signal and a low-side driving signal according to the sensed signal and a feedback signal, so as to control the high-side transistor and the low-side transistor respectively for switching the resonant circuit to generate the output voltage; wherein the feedback signal is related to an output power of the output voltage; and rendering the resonant power converter to enter a burst OFF period when the feedback signal falls below a low-power threshold, wherein both the high-side transistor and the low-side transistor are turned OFF during the burst OFF period; wherein a the burst OFF period is equal to or greater than an ON time of the high-side driving signal plus an ON time of the low-side driving signal.

From another perspective, the present invention provides a control method configured to operably control a resonant power converter, wherein the resonant power converter includes a high-side transistor and a low-side transistor which are coupled in series sequentially between an input voltage and a ground potential to form a half-bridge circuit, and a resonant circuit including at least one resonant inductor and a resonant capacitor, wherein the high-side transistor and the low-side transistor are configured to switch the resonant circuit to convert the input voltage into an output voltage; wherein the control method comprises: sensing a resonant-related parameter with a resonant state to generate a sensed signal, wherein the resonant-related parameter is related to the resonance produced by the resonant circuit; generating a high-side driving signal and a low-side driving signal according to the sensed signal and a feedback signal, so as to control the high-side transistor and the low-side transistor respectively for switching the resonant circuit to generate the output voltage; wherein the feedback signal is related to an output power of the output voltage; generating a rectification sensed signal, which includes: offsetting a DC component of the sensed signal according to an offset signal; and performing a full-wave rectification on the sensed signal to generate the rectification sensed signal; wherein the step of generating the high-side driving signal and the low-side driving signal further according to a comparison between a rectification sensed signal and a compensation signal, wherein the compensation signal is related to the feedback signal.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
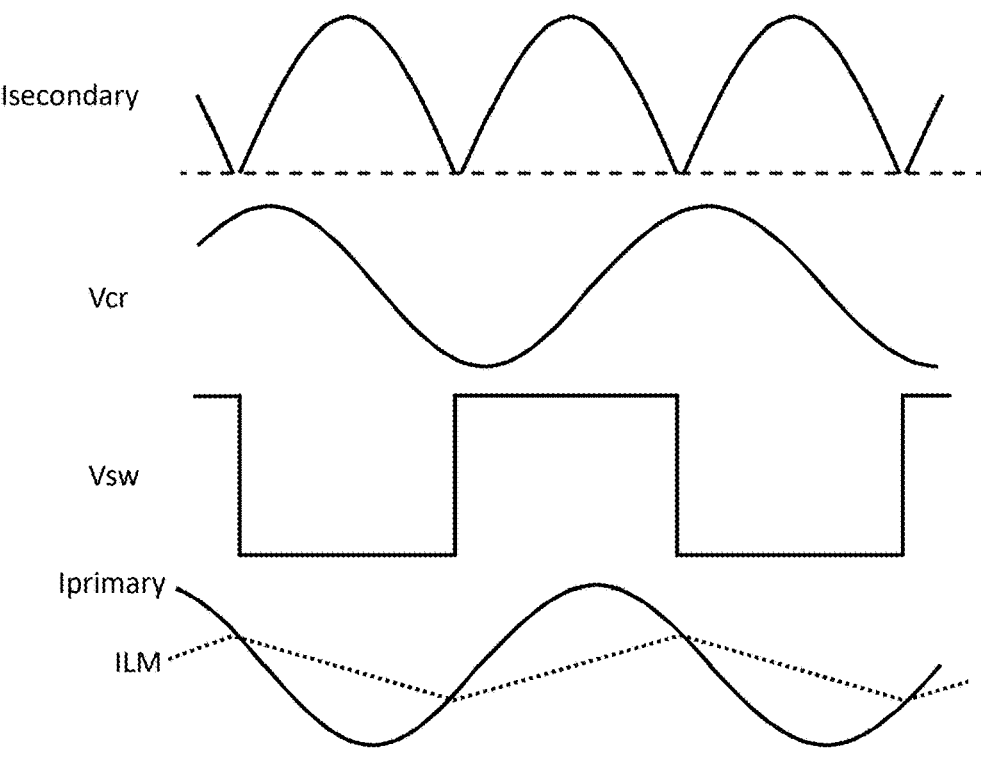
FIG. 1A shows waveforms of a prior art resonant power converter operated at a 50% duty cycle.
Figure 1B:
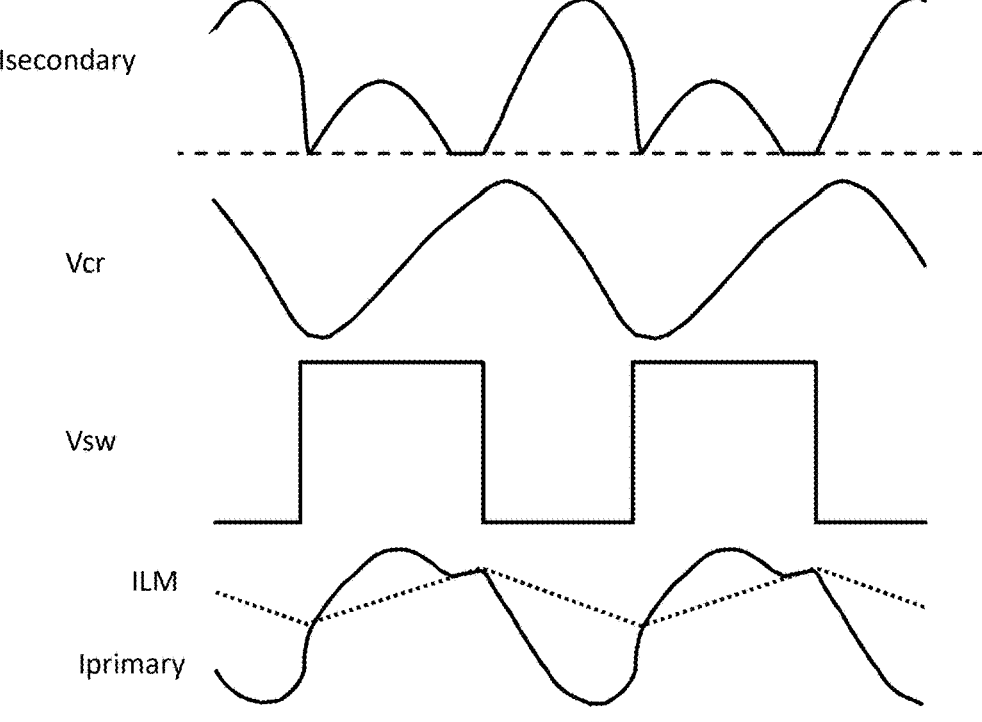
FIG. 1B shows waveforms of a prior art resonant power converter not operated at a 50% duty cycle.
Figure 2:
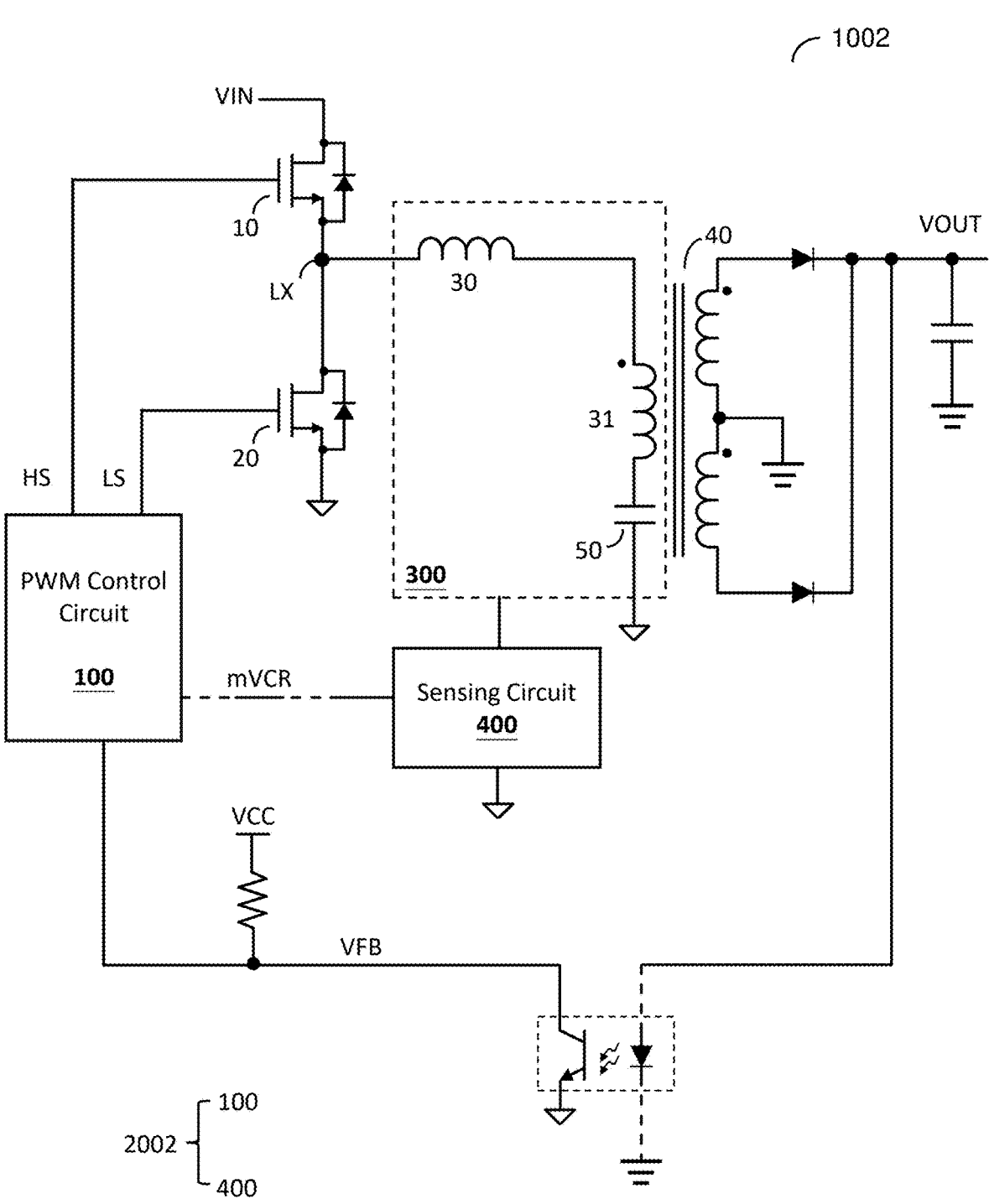
FIG. 2 shows a block diagram of a resonant power converter according to an embodiment of the present invention.

FIG. 2 shows a block diagram of a resonant power converter according to an embodiment of the present invention. In one embodiment, a conversion control circuit 2002 for controlling a resonant power converter 1002 comprises: a sensing circuit 400 and a PWM control circuit 100. In one embodiment, the resonant power converter 1002 is for example an LLC resonant power converter. The resonant power converter 1002 includes a high-side transistor 10 and a low-side transistor 20 which are coupled in series sequentially between an input voltage VIN and a ground potential to form a half-bridge circuit, and a resonant circuit 300 which includes at least one resonant inductor and a resonant capacitor 50. In this embodiment, the at least one resonant inductor includes resonant inductor 30 and resonant inductor 31. The resonant inductor 30, the resonant inductor 31, and the resonant capacitor 50 are serially connected in sequence between a switching node LX, which is between the high-side transistor 10 and the low-side transistor 20, and the ground potential. In one embodiment, the resonant inductor 31 is a magnetizing inductance of a transformer 40. The high-side transistor 10 and the low-side transistor 20 are configured to switch the resonant circuit 300 to convert the input voltage VIN into an output voltage VOUT.

In one embodiment, the sensing circuit 400 is configured to operably sense a resonant-related parameter with a resonant state to generate a sensed signal mVCR. The resonant-related parameter is related to the resonance produced by the resonant circuit 300. The PWM control circuit 100 configured to operably generate a high-side driving signal HS and a low-side driving signal LS according to the sensed signal mVCR and a feedback signal VFB, so as to control the high-side transistor 10 and the low-side transistor 20 respectively for switching the resonant circuit 300 to generate the output voltage VOUT. In this embodiment, the feedback signal VFB is related to an output power of the output voltage VOUT. In one embodiment, when the feedback signal VFB falls below a low-power threshold, the resonant power converter 1002 enters a burst OFF period, during which both the high-side transistor 10 and the low-side transistor 20 are turned OFF. The details of the burst OFF period will be elaborated in subsequent embodiments.

Figure 3:
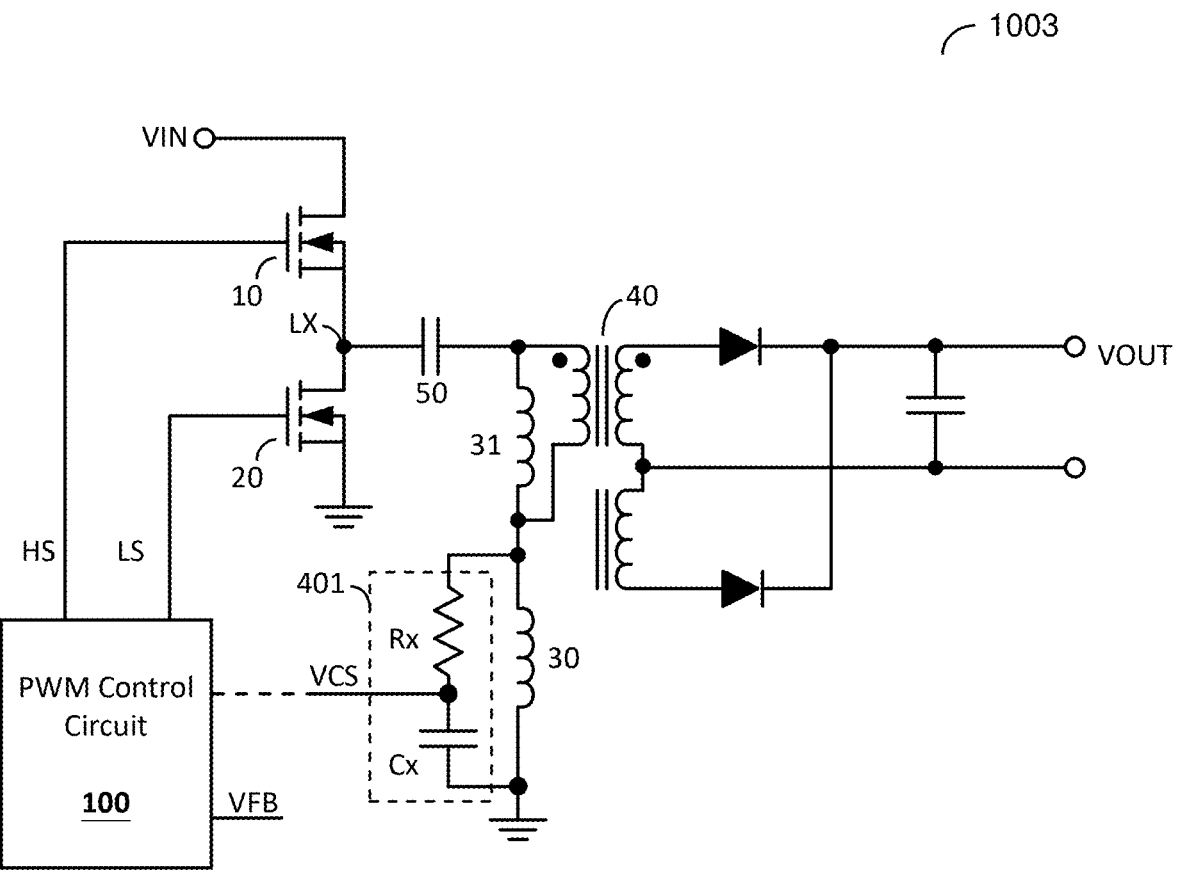
FIG. 3 shows a schematic diagram of a resonant power converter according to an embodiment of the present invention.
Figure 4:
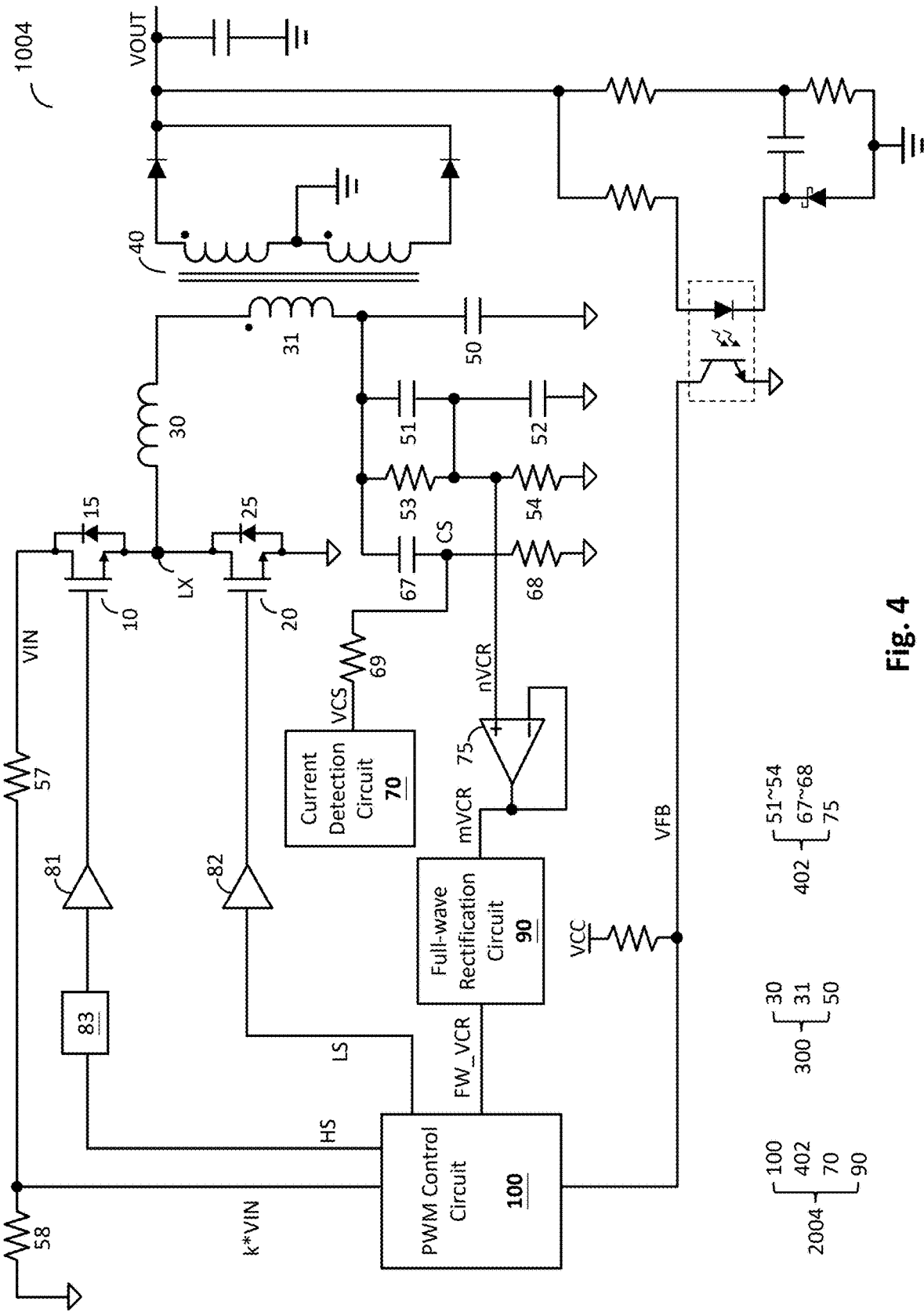
FIG. 4 shows a schematic diagram of a resonant power converter according to an embodiment of the present invention.
Figure 5:
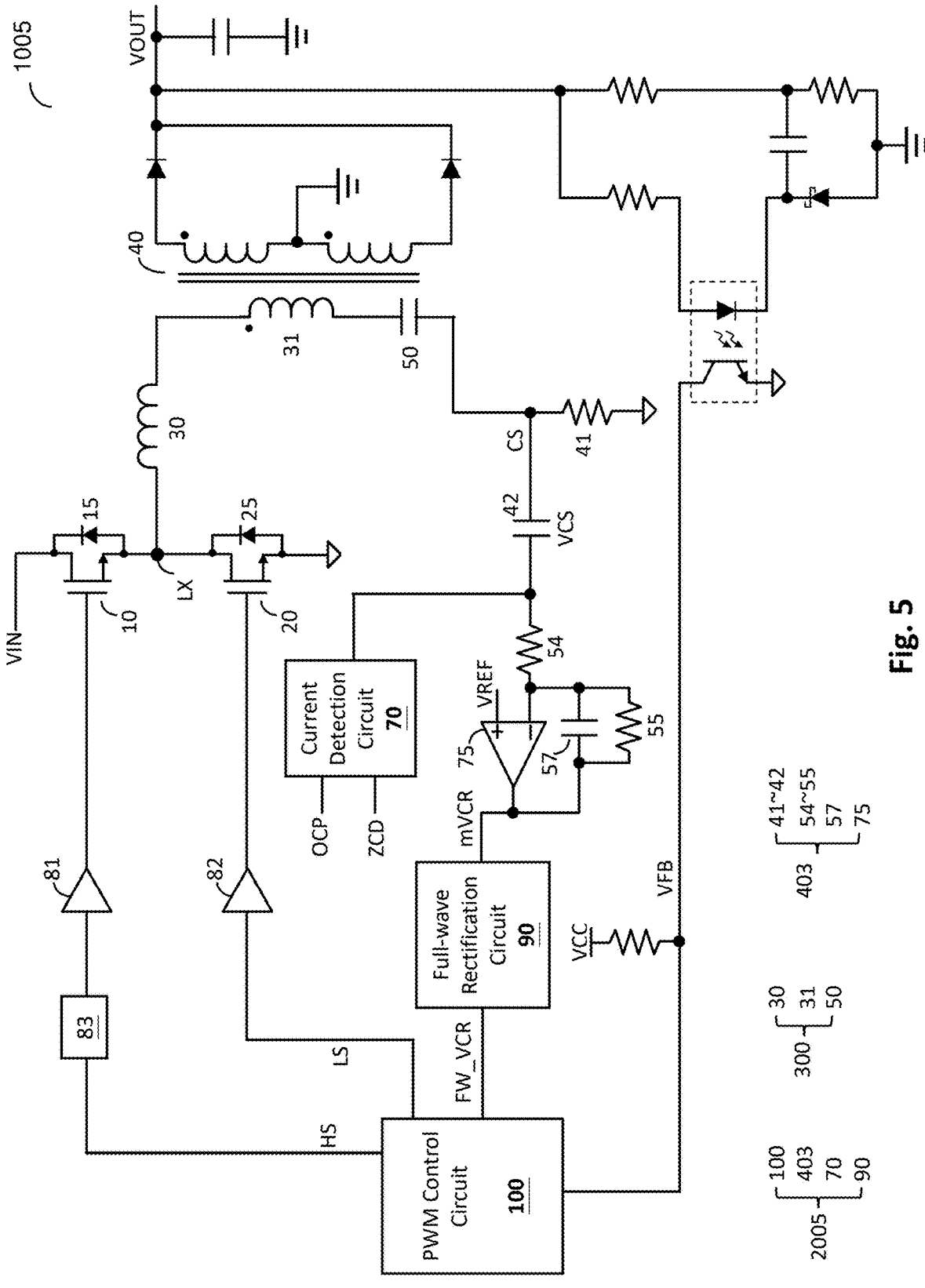
FIG. 5 shows a schematic diagram of a resonant power converter according to an embodiment of the present invention.

In one embodiment, the aforementioned resonant-related parameter includes a resonant current that flows through the resonant capacitor 50 or through the at least one resonant inductor, as described in FIGS. 3 to 5.

FIG. 3 shows a schematic diagram of a resonant power converter according to an embodiment of the present invention. In the embodiment in FIG. 3, different from the embodiment in FIG. 2, the resonant capacitor 50, the resonant inductor 31, and the resonant inductor 30 are serially connected in sequence between the switching node LX and the ground potential. In one embodiment, a sensing circuit 401 in FIG. 3 includes a current sensing resistor Rx and a current sensing capacitor Cx. In this embodiment, the current sensing resistor Rx and the current sensing capacitor Cx are connected in parallel to the resonant inductor 30 for DCR sensing. This configuration is designed to sense the current flowing through the resonant circuit 300, more specifically by DCR sensing the current flowing through the resonant inductor 30, so as to generate a current-sense signal VCS at the joint node between the current sensing resistor Rx and the current sensing capacitor Cx.

FIG. 4 shows a schematic diagram of a resonant power converter according to an embodiment of the present invention. A resonant power converter 1004 in FIG. 4 is a specific embodiment of the resonant power converter 1002 shown in FIG. 2. In one embodiment, a conversion control circuit 2004 in FIG. 4 further comprises a current detection circuit 70 and a full-wave rectification circuit 90. In one embodiment, a high-side driving signal HS is coupled to drive a high-side transistor 10 through a gate-driver 81 and a voltage level-shifter 83. A low-side driving signal LS drives a low-side transistor 20 through a gate-driver 82. In one embodiment, a sensing circuit 402, which includes capacitors 51 and 52, resistors 53 and 54, current-sense capacitors 67 and 68, and a buffer amplifier 75, is configured for current sensing. The current-sense capacitor 67 and the current-sense resistor 68, which are connected in series and coupled to the sensing circuit 402, and configured to sense a current flowing through the resonant capacitor 50 to generate a current-sense signal CS.

Still referring to FIG. 4 is further configured to generate a current-sense signal VCS. Specifically, a resistor 69 combined with the current detection circuit 70 provides a bias voltage for the current-sense signal CS, so as to generate the current-sense signal VCS. In one embodiment, capacitors 51 and 52 are configured as a capacitive voltage-divider, which is configured to sense the voltage across the resonant capacitor 50 to generate a capacitor signal nVCR. A buffer amplifier 75 is configured to generate a sensed signal mVCR according to the capacitor signal nVCR. Subsequently, the full-wave rectification circuit 90 is configured to operably generate a rectification sensed signal FW_VCR by performing a full-wave rectification on the sensed signal mVCR.

In one embodiment, the PWM control circuit 100 generates the high-side driving signal HS and the low-side driving signal LS by comparing the rectification sensed signal FW_VCR with a feedback signal VFB to regulate the output voltage VOUT. Resistors 57 and 58 are configured as a resistive voltage divider, which is connected to the input voltage VIN to generate a bias voltage k*VIN.

FIG. 5 shows a schematic diagram of a resonant power converter according to an embodiment of the present invention. Similar to FIG. 4, a resonant power converter 1005 in FIG. 5 is another specific embodiment of the resonant power converter 1002 shown in FIG. 2. In one embodiment, a sensing circuit 403 includes a current-sense resistor 41, a blocking capacitor 42, an input resistor 54, a feedback resistor 55, a feedback capacitor 57 and the operational amplifier 75. In one embodiment, the current-sense resistor 41 is connected in series with the resonant capacitor 50 to generate a current-sense signal CS.

As shown in FIG. 5, an integrator generates a sensed signal mVCR based on the current-sense signal CS. The integrator includes the operational amplifier 75 along with the feedback capacitor 57 connected in parallel with the feedback resistor 55, and the input resistor 54. The operational amplifier 75 includes a DC-bias VREF allowing the circuit to operate on a single power supply instead of dual supplies. The blocking capacitor 42 is connected between the current-sense signal CS and the input of the integrator (input resistor 54). This blocking capacitor 42 provides a high impedance to the gain of the DC signal (the DC-bias VREF of the integrator). Consequently, the DC signal at the positive input of the operational amplifier 75 remains unaffected by the feedback resistors connected to the negative input. Additionally, the blocking capacitor 42 effectively removes the DC component from the current-sense signal CS. For the details not elaborated herein, please refer to the descriptions of FIG. 2 and FIG. 4 mentioned above.

Figure 6:
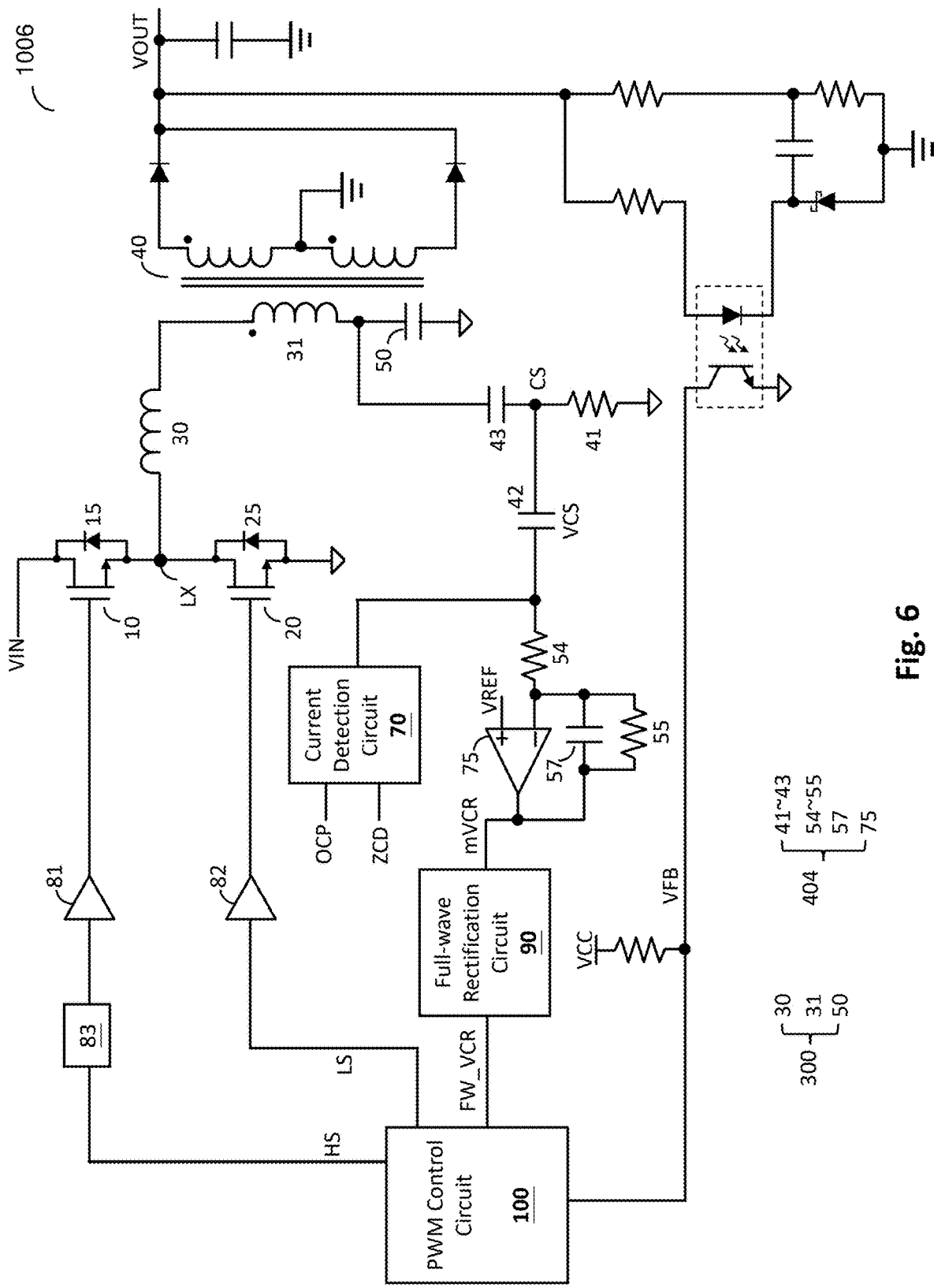
FIG. 6 shows a schematic diagram of a resonant power converter according to an embodiment of the present invention.

FIG. 6 shows a schematic diagram of a resonant power converter according to an embodiment of the present invention. Similar to FIG. 5, a resonant power converter 1006 in FIG. 6 is another specific embodiment of the resonant power converter 1002 shown in FIG. 2. Differences from FIG. 5 in FIG. 6 include: a current-sense capacitor 43 and the current-sense resistor 41, connected in series, are configured to sense the current flowing through the resonant capacitor 50 and to generate the current-sense signal CS, which represents a derivative of the voltage across the resonant capacitor 50 and literally represents the current flowing through the resonant capacitor 50. For the details not elaborated herein, please refer to the descriptions of FIG. 2, FIG. 4 and FIG. 5 mentioned above.

Figure 7A:
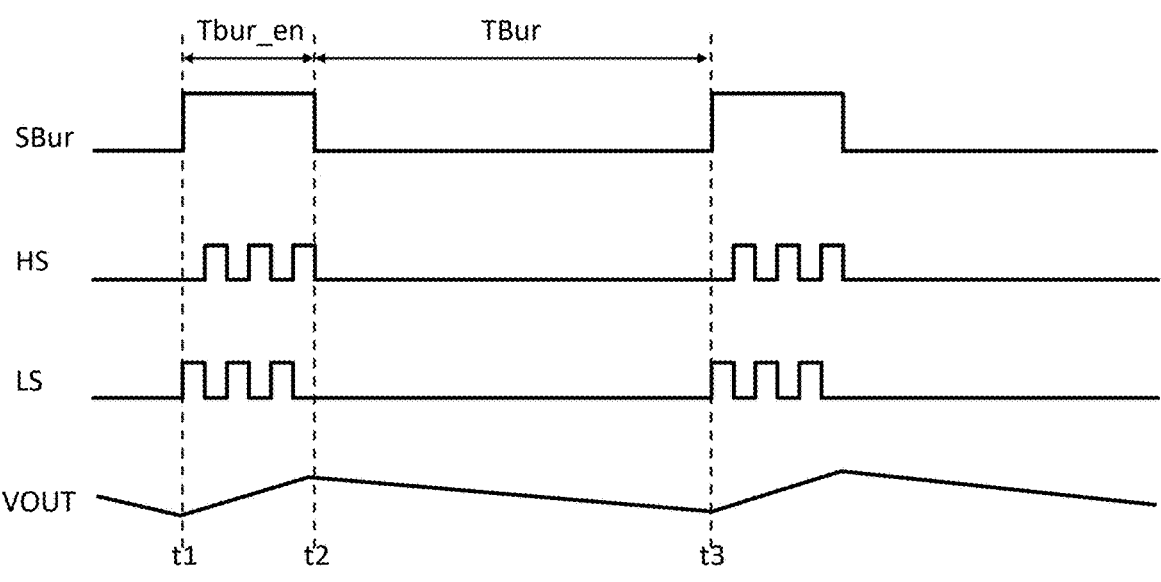
FIGS. 7A and 7B show waveforms of a resonant power converter operated under light load and deep light load (such as standby mode) conditions, respectively, according to an embodiment of the present invention.
Figure 7B:
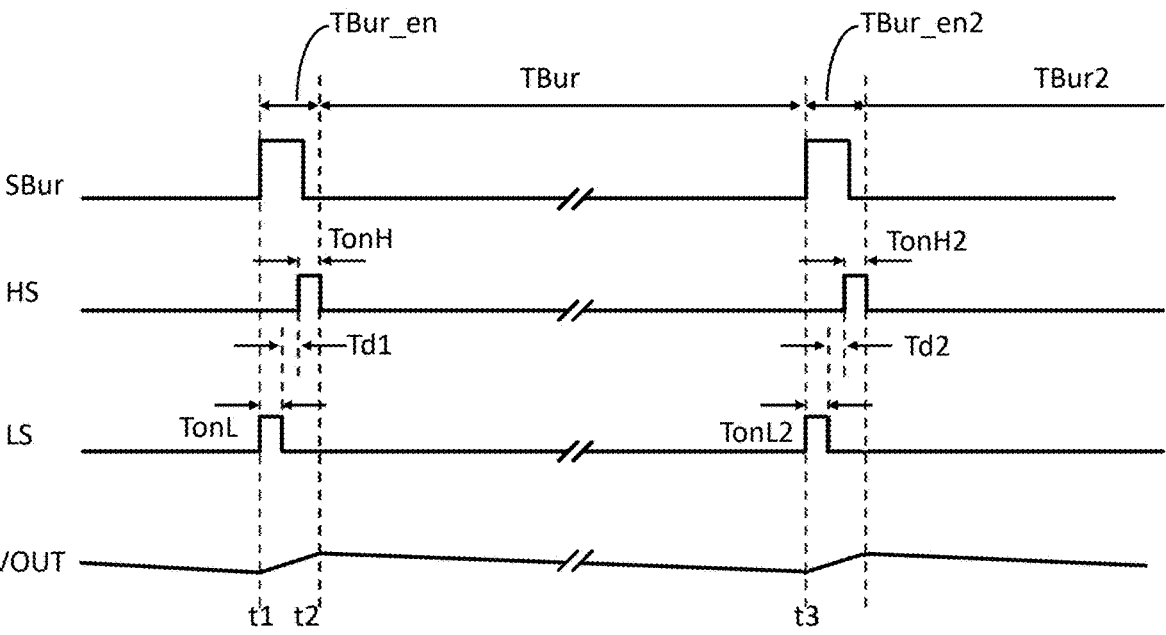

FIG. 7A and FIG. 7B show waveforms of a resonant power converter operated under light load and deep light load (such as standby mode) conditions, respectively, according to an embodiment of the present invention. In one embodiment, a period of the burst period signal Sbur (e.g. from time point t1 to t3) includes a burst EN period TBur_en and the burst OFF period TBur. In one embodiment, the burst OFF period TBur of the burst period signal Sbur commences in synchronization with the high-side driving signal HS being turned off (e.g. at time point t2). The low-side driving signal LS is turned on (e.g. at time point t3), in synchronization with the end of the burst OFF period TBur. In another embodiment, the burst OFF period is also triggered when the current-sense signal CS exceeds an over-current threshold. In one embodiment, the duration of the burst OFF period TBur increases in response to the decrease in the output power of the output voltage VOUT.

In one embodiment, during the burst OFF period TBur, both the high-side transistor 10 and the low-side transistor 20 are turned off, allowing the junction capacitors of both transistors 10 and 20 to resonate with the resonant inductor 30 and the magnetizing inductance of the transformer 40, which is also known as quasi-resonance. This resonant energy experiences damping due to parasitic resistance within the loop. If the load is not very light, the burst OFF period becomes shorter, and the resonant current flowing through the resonant capacitor 50 has not fully attenuated before the end of the burst OFF period.

As shown in FIG. 7A and FIG. 7B, in one embodiment, after the beginning of the burst EN period TBur_en (e.g. time point t1), the low-side driving signal LS is turned on firstly, and before the end of the burst EN period TBur_en (e.g. time point t2), the high-side driving signal HS is turned off lastly. In one embodiment, the burst EN period TBur_en includes at least one pair of a low-side ON time of the low-side driving signal LS and a high-side ON time of the high-side driving signal HS. For example, as shown in FIG. 7B, the burst EN period TBur_en includes one low-side ON time TonL followed by one high-side ON time TonH.

Still referring to FIG. 7B, from one perspective, when the resonant power converter operates in a burst mode, in a burst EN period TBur_en, the low-side driving signal LS is turned on for a low-side ON time TonL. Subsequently in the burst EN period TBur_en, the high-side driving signal HS and the low-side driving signal LS are turned off for a first dead time Td1, after the first dead time Td1, the high-side driving signal HS is turned on for a high-side ON time TonH. Subsequently in a burst OFF period TBur, the high-side driving signal HS and the low-side driving signal LS are turned off for the burst OFF period TBur. Subsequently in another burst EN period Tbur_en2, the low-side driving signal LS is turned on for a low-side ON time TonL2. Subsequently in the burst EN period TBur_en2, the high-side driving signal HS and the low-side driving signal LS are turned off for a second dead time Td2, after the second dead time Td2, the high-side driving signal HS is turned on for a high-side ON time TonH2. Subsequently in another burst OFF period TBur2, the high-side driving signal HS and the low-side driving signal LS are turned off for the burst OFF period TBur2, and similar cycles may repeat. The details of subsequent waveforms can be inferred from the foregoing description and are not elaborated herein.

In one embodiment, the burst OFF period TBur is longer than the first dead time Td1 or the second dead time Td2. In one embodiment, a lower limit of the burst OFF period Tbur is equal to a switching period of the high-side driving signal HS or the low-side driving signal LS. For example, the switching period can be a sum of the high-side ON time TonH and the low-side ON time TonL2 in FIG. 7B.

Figure 8:
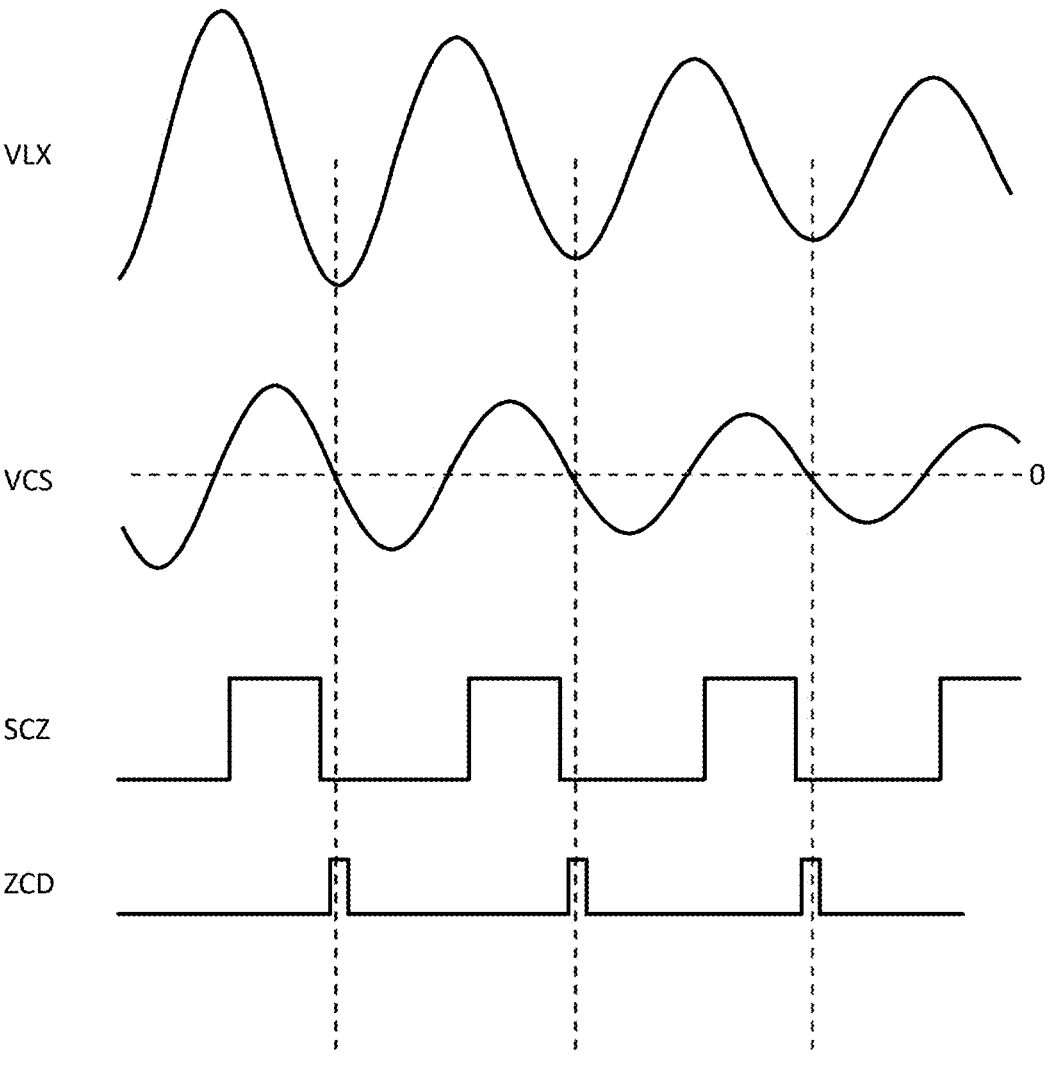
FIG. 8 shows waveforms of the current-sense signal and the zero-current signal ZCD according to an embodiment of the present invention.

FIG. 8 shows waveforms of the current-sense signal VCS and the zero-current signal ZCD according to an embodiment of the present invention, for example caused by the quasi-resonance during the burst OFF period. In one embodiment, the current-sense signal VCS transitions from positive to negative, leading to a voltage VLX of the switching node LX reaching a lowest point at the same time. At this moment, the current detection circuit (e.g. 70 in FIG.

4~6) identifies zero current at specific points and generates a zero-current signal ZCD. In one embodiment, precisely when the zero-current signal ZCD is generated, marking the instance when the resonant current crosses zero from positive to negative, the low-side transistor 20 is activated, so as to achieve soft switching. In other words, the low-side transistor 20 is turned on in synchronization with the zero current time point represented by the zero-current signal ZCD.

Note that, the above embodiment achieves valley-voltage switching, effectively reducing switching losses as the burst OFF period ends. In one embodiment, the end of the burst OFF period is initially synchronized with the zero current point of the current-sense signal VCS. In this embodiment, the burst OFF period Tbur is equal to or greater than a quasi-resonance period which is related to the synchronization of the zero current point of a current-sense signal VCS. In another embodiment, the burst OFF period ends asynchronously with the zero current point of the current-sense signal VCS when the burst OFF period exceeds a timeout period threshold.

Figure 9A:
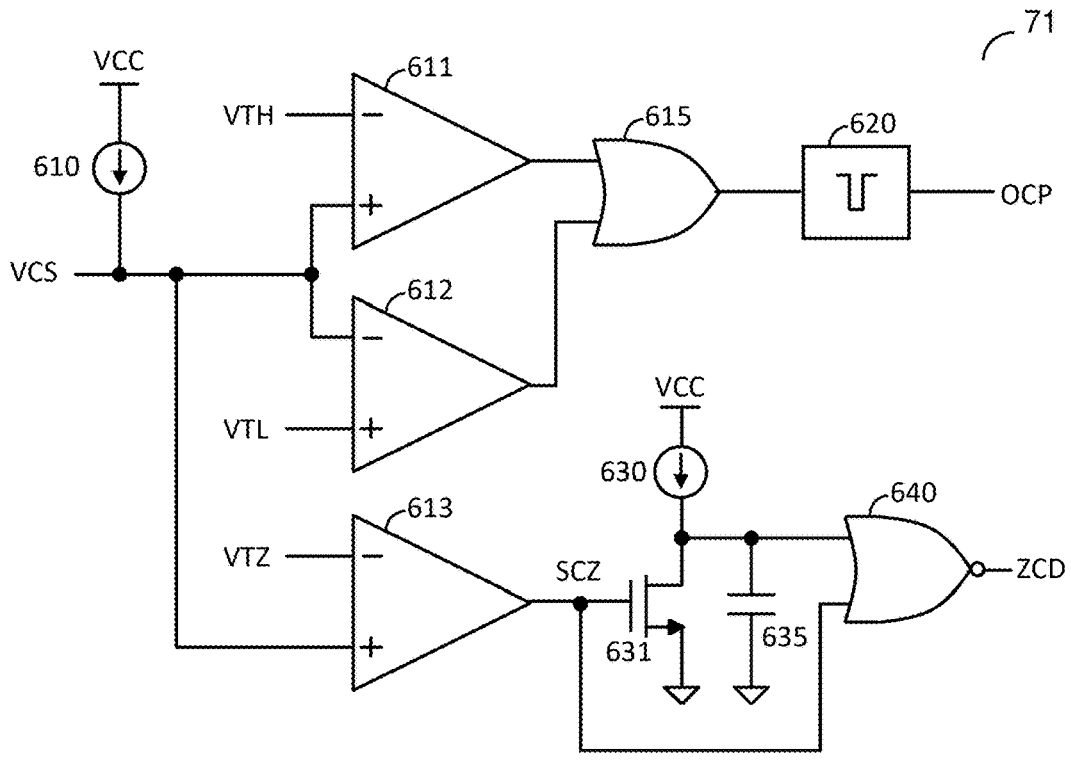
FIG. 9A shows a schematic diagram of a current detection circuit corresponding to FIG. 4 according to an embodiment of the present invention.

Refer FIG. 9 in conjunction with FIG. 4, FIG. 8. FIG. 9A shows a schematic diagram of a current detection circuit corresponding to FIG. 4 for generating both an over-current signal OCP and a zero-current signal ZCD according to an embodiment of the present invention. In one embodiment of a current detection circuit 71 in FIG. 9A, the over-current signal OCP is generated through a one-shot circuit 620 when the current-sense signal VCS exceeds a threshold VTH or falls below a threshold VTL. A signal SCZ is generated by a comparator 613 when the current-sense signal VCS surpasses a threshold VTZ. In this embodiment, the resistor 69 (in FIG. 4) with a current source 610 flowing through generates the bias voltage for the current-sense signal CS, so as to generate the current-sense signal VCS with a DC voltage provided by the bias voltage. The threshold VTZ is set slightly higher than the bias voltage determined by the current source 610 and the resistor 69. The pulse generator, which includes a current source 630, a transistor 631, a capacitor 635, and a NOR gate 640, is configured to generate the zero-current signal ZCD in response to the falling edge of the signal SCZ.

Figure 9B:
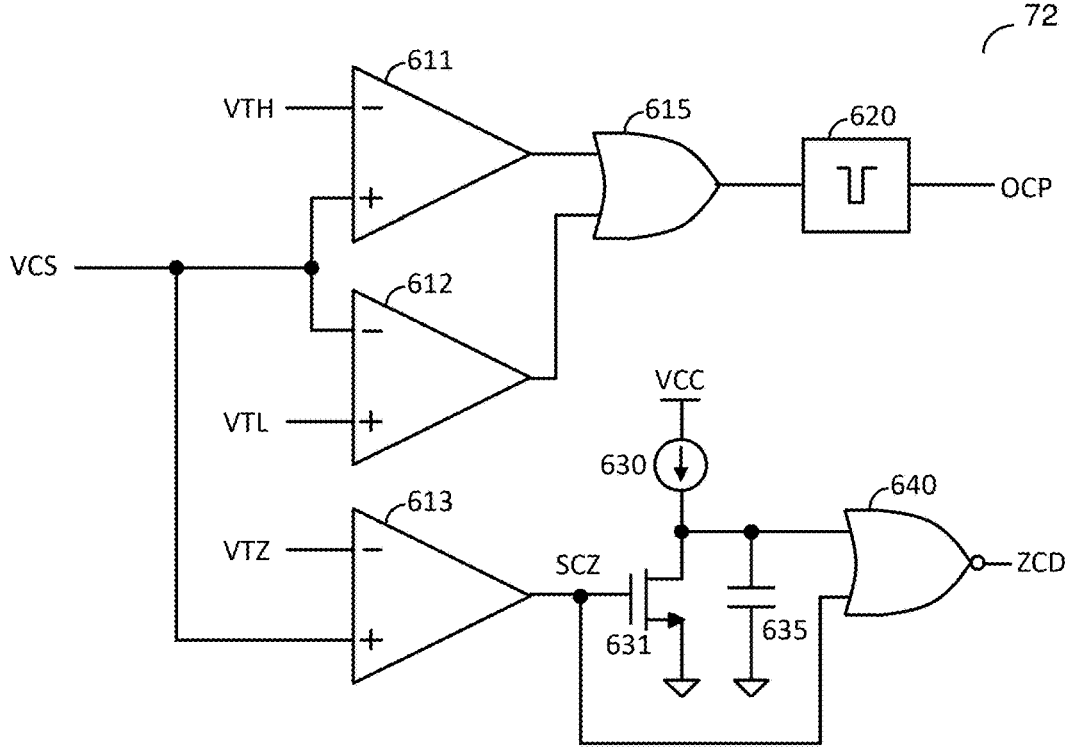
FIG. 9B shows a schematic diagram of a current detection circuit corresponding to FIG. 5 or FIG. 6 according to an embodiment of the present invention.

FIG. 9B shows a schematic diagram of a current detection circuit corresponding to FIG. 5 or FIG. 6 according to an embodiment of the present invention. A current detection circuit 72 in FIG. 9B is similar to the current detection circuit 71 in FIG. 9A. The difference from FIG. 9A in FIG. 9B is that, the current-sense signal VCS is generated across the blocking capacitor 42 (in FIG. 5 or FIG. 6), therefore the current detection circuit 72 does not need to include the current source 610. For the details not elaborated herein, please refer to the descriptions of FIG. 9A mentioned above.

Figure 10:
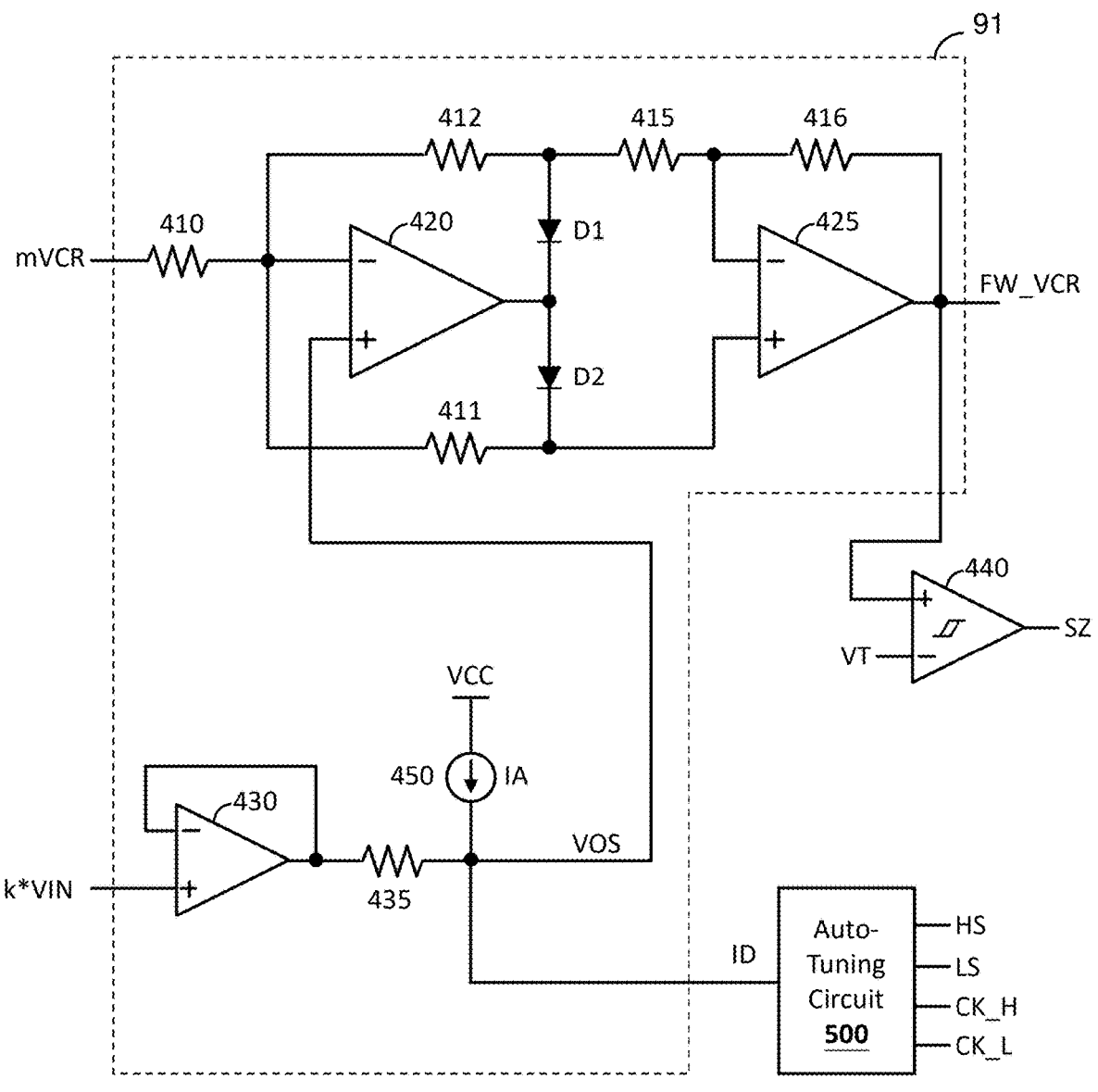
FIG. 10 shows a schematic diagram of a full-wave rectification circuit according to an embodiment of the present invention.
Figure 11:
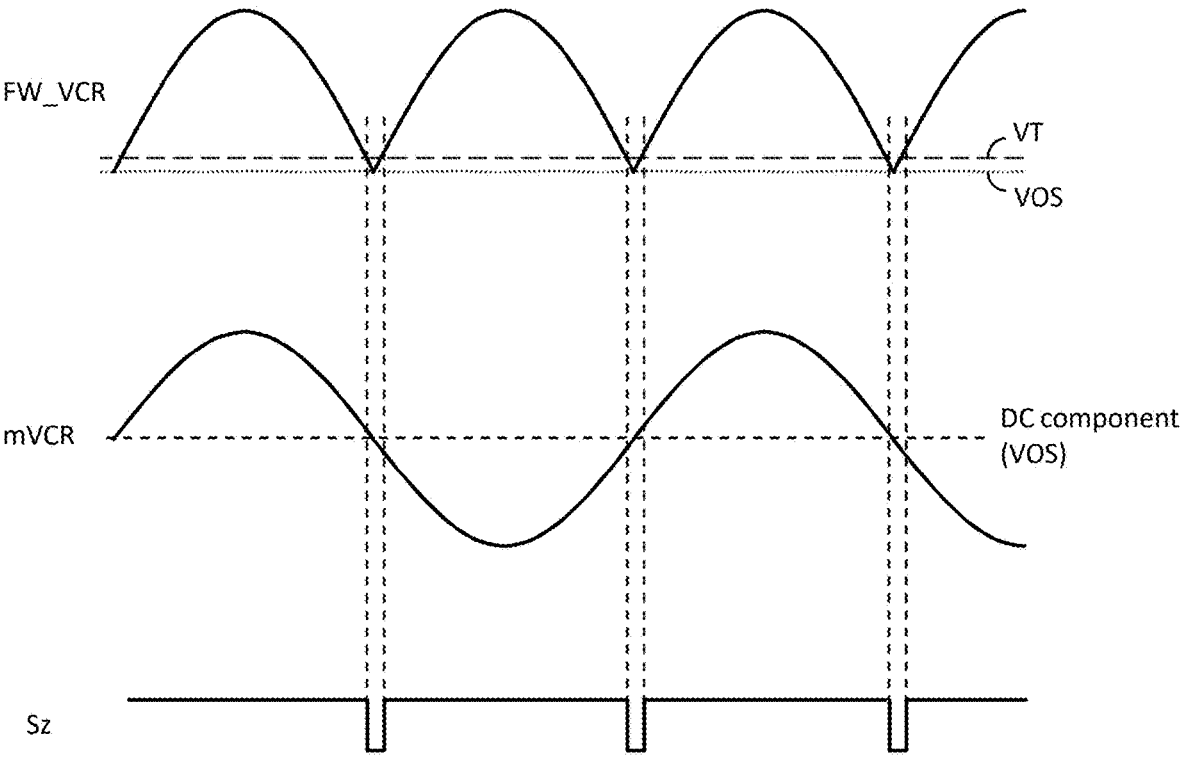
FIG. 11 shows operation waveforms of a full-wave rectification circuit according to an embodiment of the present invention.

Referring to FIG. 10 and FIG. 11. FIG. 10 shows a schematic diagram of a full-wave rectification circuit according to an embodiment of the present invention. FIG. 11 shows operation waveforms of a full-wave rectification circuit according to an embodiment of the present invention. A full-wave rectification circuit 91 in FIG. 10 is a specific embodiment of the full-wave rectification circuit 90 in FIG. 4 to FIG. 6. In one embodiment, the full-wave rectification circuit 91 includes operational amplifiers 420 and 425, diodes D1 and D2, resistors 410, 411, 412, 415, 416 and 435, a buffer amplifier 430 and a current source 450. The full-wave rectification circuit 91 is configured to receive the sensed signal mVCR in order to generate the rectification sensed signal FW_VCR. In this embodiment, the full-wave rectification circuit 91 includes an offset signal VOS to offset the DC component of the sensed signal mVCR. As shown in FIG. 11, in one embodiment, the sensed signal mVCR oscillates between 0.5V to 2.5V (with DC component=1.5V) and the offset signal VOS is automatically adjusted around 1.5V. In this embodiment, the DC component of the sensed signal mVCR is equal to the offset signal VOS.

Still referring to FIG. 10 and FIG. 11, in one embodiment, a comparator 440 generates the crossover signal Sz when the rectification sensed signal FW_VCR falls below the low-voltage threshold VT. The low-voltage threshold VT is slightly higher than the voltage of the offset signal VOS. The offset signal VOS is coupled to the operational amplifier 420 to adjust the DC bias of the full-wave rectification circuit 91. In one embodiment, the offset signal VOS includes the bias voltage k*VIN and an adjustment signal VADJ. The adjustment signal VADJ which can be expressed as the following equation is configured to adjust an offset voltage of the offset signal VOS to modify the rectification sensed signal FW_VCR.

$$VPDJ = (IA - ID) \times R435$$

In the above equation, the current IA represents a constant current provided by the constant current source 450, and the current ID is an adjustable current generated by an auto-tuning circuit 500. The auto-tuning circuit 500 generates the current ID in response to the ON period of the high-side driving signal HS and the ON period of the low-side driving signal LS. Both the current ID and the offset signal VOS are generated based on the difference between the duty cycle of the high-side driving signal HS and the duty cycle of the low-side driving signal LS. The offset signal VOS is then used to adjust the DC bias of the full-wave rectification circuit 91 and the duty cycle of both the high-side driving signal HS and low-side driving signals LS. Ultimately, the offset signal VOS is employed to match the duty cycle of the high-side driving signal HS with that of the low-side driving signal LS, or vice versa.

Figure 12:
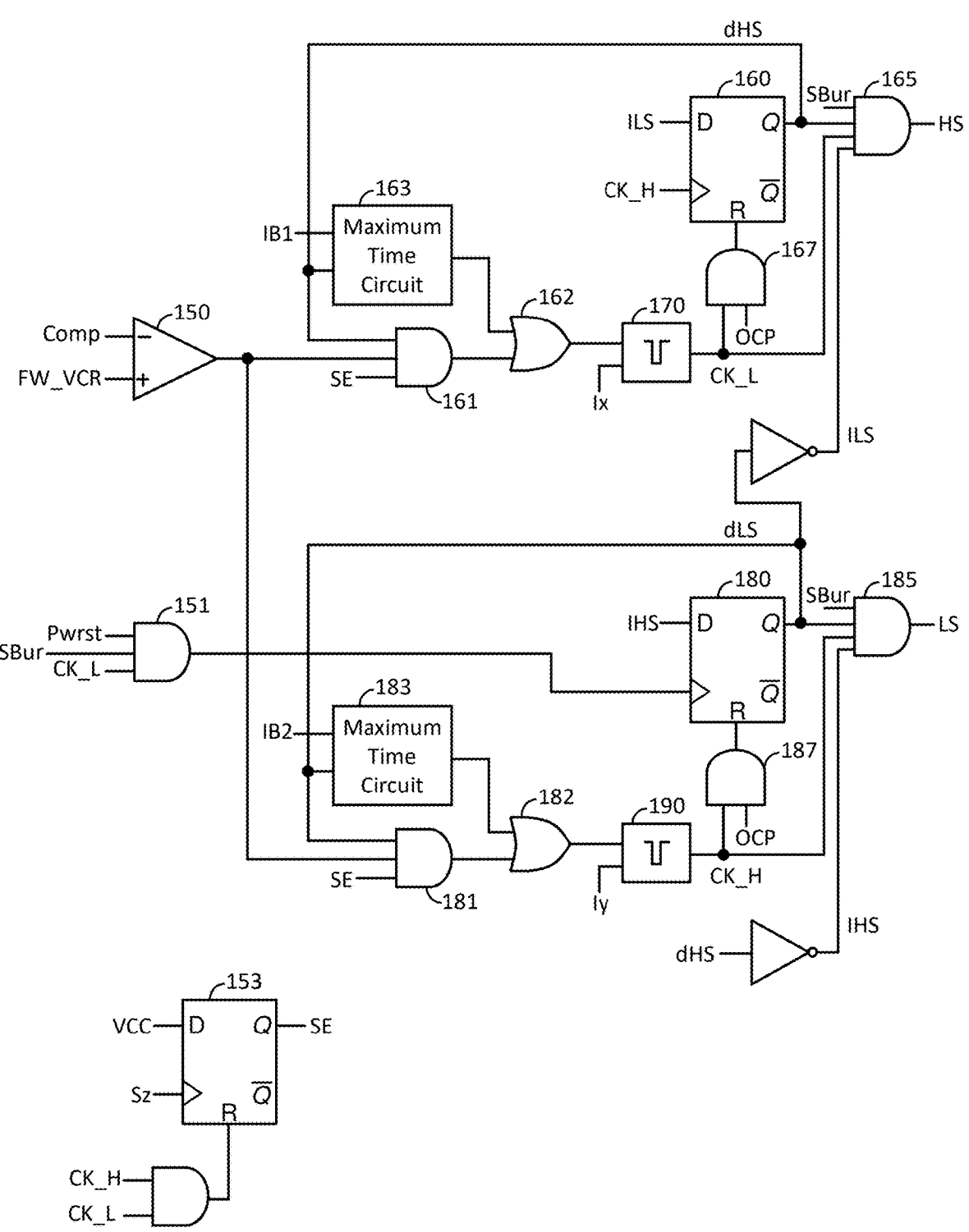
FIG. 12 shows a schematic diagram of a portion of a PWM control circuit for generating the high-side driving signal and the low-side driving signal according to an embodiment of the present invention.

FIG. 12 shows a schematic diagram of a portion of a PWM control circuit for generating the high-side driving signal and the low-side driving signal according to an embodiment of the present invention. A phase signal SE is set and enabled by a flip-flop 153 according to the rising edge of the crossover signal Sz. The phase signal SE is reset and disabled by either a first dead-time signal CK_L or a second dead-time signal CK_H when the rectification sensed signal FW_VCR exceeds a compensation signal Comp (via a comparator 150).

In one embodiment, when the high-side driving signal HS is turned on and the phase signal SE is enabled, the high-side driving signal HS is turned off through an AND gate 161, an OR gate 162 and a one-shot circuit 170 (which generates the first dead-time signal CK_L) when the rectification sensed signal FW_VCR exceeds the compensation signal Comp. Subsequently, when the high-side driving signal HS is turned off, the low-side driving signal LS is turned on by a flip-flop 180 after a first dead-time of the first dead-time signal CK_L. In one embodiment, when the low-side driving signal LS is turned on and the phase signal SE is enabled, the low-side driving signal LS is turned off through an AND gate 181, an OR gate 182, and a one-shot circuit 190 (which generates the second dead-time signal CK_H) when the rectification sensed signal FW_VCR exceeds the compensation signal Comp. When the low-side driving signal LS is turned off, the high-side driving signal HS is turned on again by a flip-flop 160 after a second dead-time of the second dead-time signal CK_H.

Still referring to FIG. 12, in one embodiment, both flip-flops 160 and 180 are reset by the over-current signal OCP through AND gates 167 and 187, in order to deactivate the high-side driving signal HS and the low-side driving signal LS when over-current occurs in the resonant circuit.

In one embodiment, both the high-side driving signal HS and the low-side driving signal LS are turned off when a burst period signal SBur is generated during a light-load condition.

In one embodiment, the low-side driving signal LS will be triggered first by an AND gate 151 either when the power is turned on or at the start of switching after the burst OFF period. The pulse width of both the high-side driving signal HS and the low-side driving signal LS is limited by a maximum ON-time. The maximum ON-time signal for the high-side driving signal HS is generated by a maximum ON-time circuit 163 when the high-side driving signal HS is generated. Similarly, the maximum ON-time signal for the low-side driving signal LS is generated by a maximum ON-time circuit 183 when the low-side driving signal LS is generated.

In one embodiment, during light-load and normal operating conditions, these maximum ON-time signals is configured to limit the switching-cycle time to be not longer than the resonant period of the resonant circuit. The switching-cycle time includes both the periods (i.e., ON time period) of the high-side driving signal HS and the low-side driving signal LS.

In another embodiment, when the input voltage VIN becomes low, and the output experiences heavy load conditions, the maximum on-time signals can be lengthened and can allow the switching-cycle time to optionally exceed the resonant period of the resonant circuit, for meeting hold-up time requirement, for example.

Figure 13A:
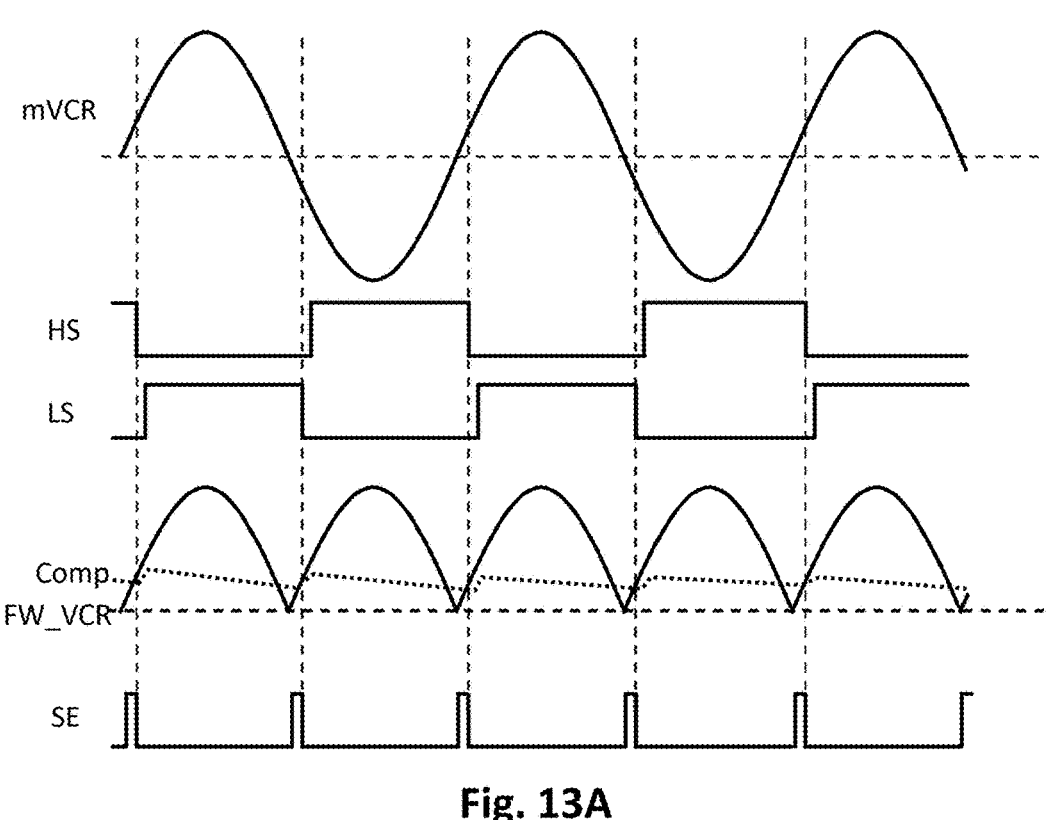
FIG. 13A shows operation waveforms of a PWM control circuit which is operating under light load condition according to an embodiment of the present invention.
Figure 13B:
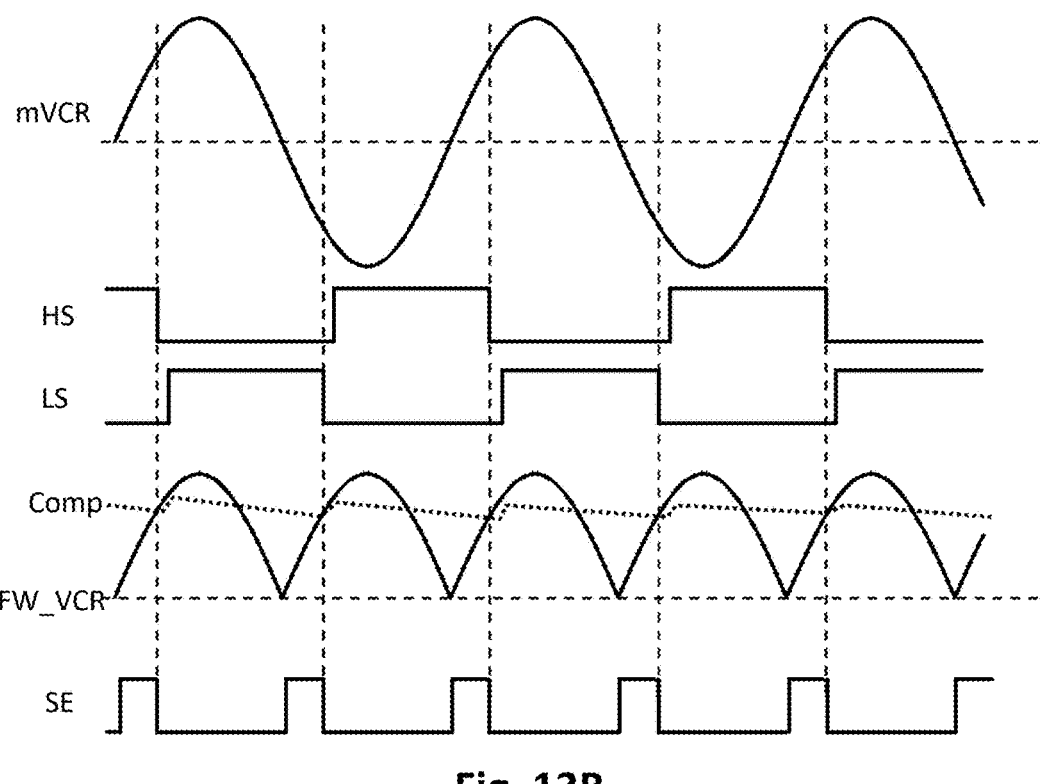
FIG. 13B shows operation waveforms of a PWM control circuit which is operating under heavy load condition according to an embodiment of the present invention.
Figure 13C:
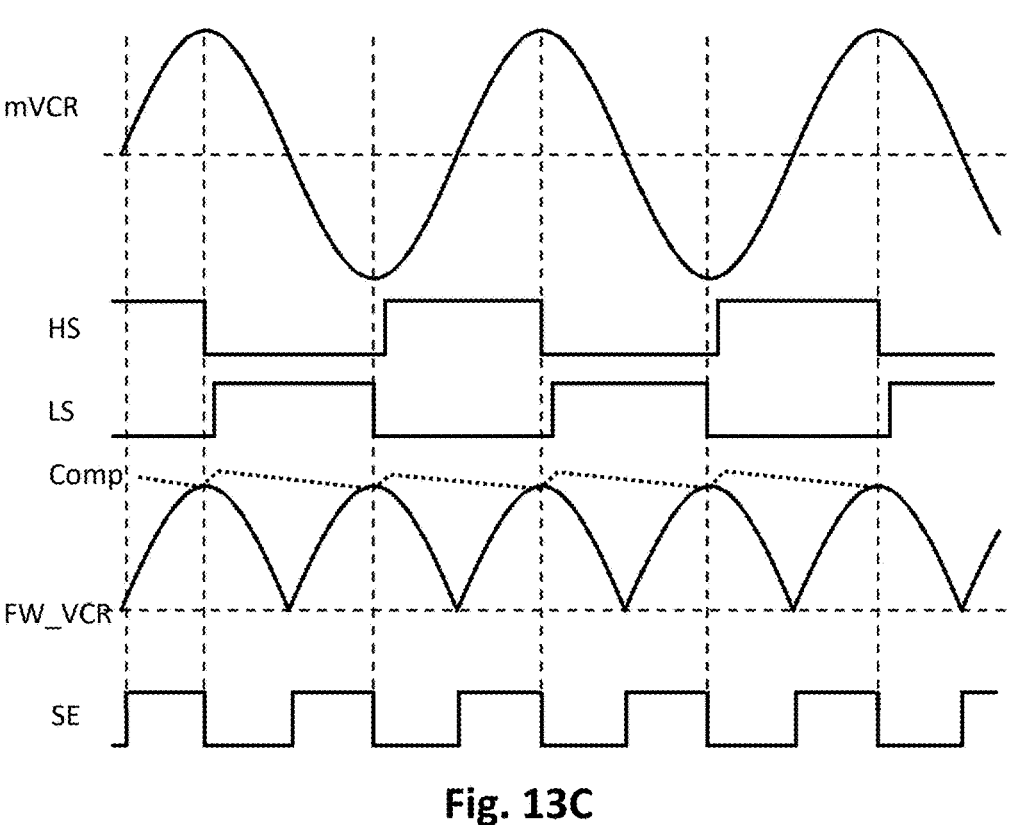
FIG. 13C shows operation waveforms of a PWM control circuit which is operating under full load condition according to an embodiment of the present invention.

FIG. 13A, FIG. 13B, and FIG. 13C show operation waveforms of the PWM control circuit according to an embodiment of the present invention. FIG. 13A displays the waveforms when the resonant power converter is operating under light load condition. FIG. 13B shows the waveforms for heavy-load operation, and FIG. 13C represents the waveforms during full-load operation. Note that from one perspective, the phase of the phase signal SE represents phase shift between the resonance of the resonant circuit 300 and the switching time point of the high-side driving signal HS or the low-side driving signal LS, which actually varies level of resonant output power delivered by the resonant power converter. In other words, the power level of the resonant power converter is controlled through the phase shift of the phase signal SE, which is determined by the comparison between the compensation signal Comp and the rectification sensed signal FW_VCR. Through the feedback control, the output power can be regulated to a predetermined level accordingly. Regarding the details of the waveforms in FIG. 13A to FIG. 13C, those skilled in the art can infer from the foregoing FIG. 12, and are not elaborated herein.

Figure 14:
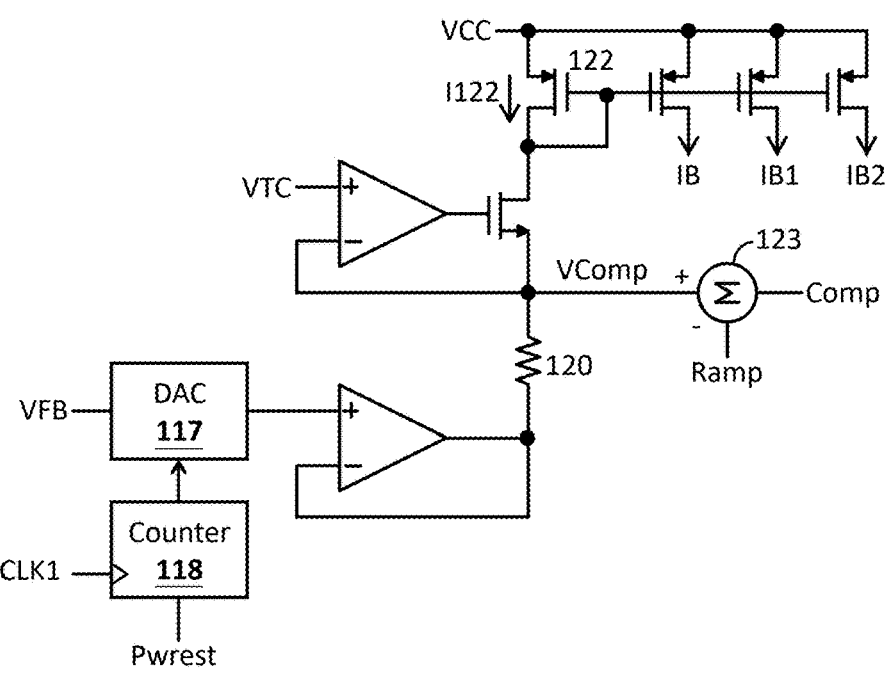
FIG. 14 shows a schematic diagram of a portion of a PWM control circuit for generating the compensation signal based on the feedback signal according to an embodiment of the present invention.

FIG. 14 shows a schematic diagram for generating the compensation signal Comp based on the feedback signal VFB according to an embodiment of the present invention. In one embodiment, a soft-start circuit which includes a digital-to-analog converter 117 and a counter 118 is configured to enable a gradual power-on sequence, during which the feedback signal VFB progressively increases, according to the feedback signal VFB. The full-scale input of the digital-to-analog converter 117 is connected to the feedback signal VFB. The output of counter 118 is reset to zero (represented as 0000) by a power-on-reset signal Pwrest when the resonant power converter is turned on. The output of the digital-to-analog converter 117 is set to zero voltage as well. Afterward, the counter 118 is clocked by a clock signal CLK1, and its output will increase to full scale (represented as 1111), aligning the output of digital-to-analog converter 117 with the level of the feedback signal VFB. When the voltage of the feedback signal VFB decreases below a reference voltage VTC, an adjustment feedback signal Vcomp is clamped to the reference voltage VTC, so as to clamp the voltage of the feedback signal VFB not lower than the reference voltage VTC, and a current I122 flowing through a transistor 122 is generated. The current I122 can be expressed as the following equation.

$$I122 = (VVTC - VVFB)/R120$$

In the above equation, VVFB and VVTC represent a voltage of the feedback signal VFB and a voltage of the reference voltage VTC respectively, and R120 represents a resistance of a resistor 120. The currents IB, IB1, and IB2 are generated by mirroring the current I122. These currents, IB, IB1, and IB2, are generated and increased in response to the decrease in the feedback signal VFB when the feedback signal VFB falls below the reference voltage VTC. For slope compensation in the feedback loop, a sum circuit 123 subtracts a ramp signal Ramp from the adjustment feedback signal Vcomp to generate a compensation signal Comp.

Figure 15:
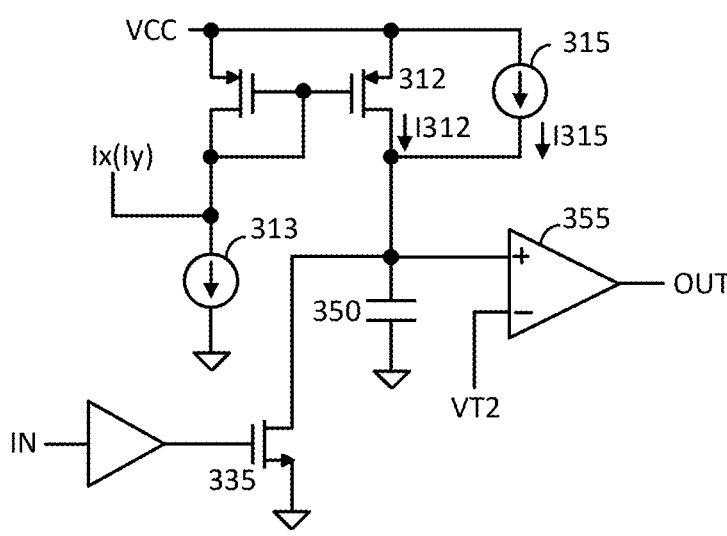
FIG. 15 shows a schematic diagram of the one-shot circuits in FIG. 12 according to a preferred embodiment of the present invention.

Referring to FIGS. 12 and 15. FIG. 15 shows a schematic diagram of the one-shot circuits 170 and 190 in FIG. 12 according to a preferred embodiment of the present invention. In one embodiment, when an input IN of the one-shot circuits 170 or 190 is a logic-low signal, a capacitor 350 is charged to a high-state. When the input IN becomes a logic-high signal, the transistor 335 discharges the capacitor 350, such that the output OUT of a comparator 355 is logic-low. When the output OUT of the one-shot circuit 170 or 190 is logic-low, it will reset the flip-flop 160 or 180, subsequently causing the input IN of the one-shot circuit 170 or 190 to go logic-low. The output OUT of the one-shot circuit 170 or 190 remains logic-low until the voltage of the capacitor 350 is charged to a level that exceeds the threshold voltage VT2. The pulse width of the one-shot circuits 170 and 190, which corresponds to the pulse width of the first dead-time CK_L and the pulse width of the second dead-time CK_H, is determined by the capacitance of the capacitor 350, a current I312 through a transistor 312 and a current I315 of a current source 315. The pulse width of the one-shot circuits 170 and 190 can be adjusted by current Ix and Iy respectively.

Figure 16:
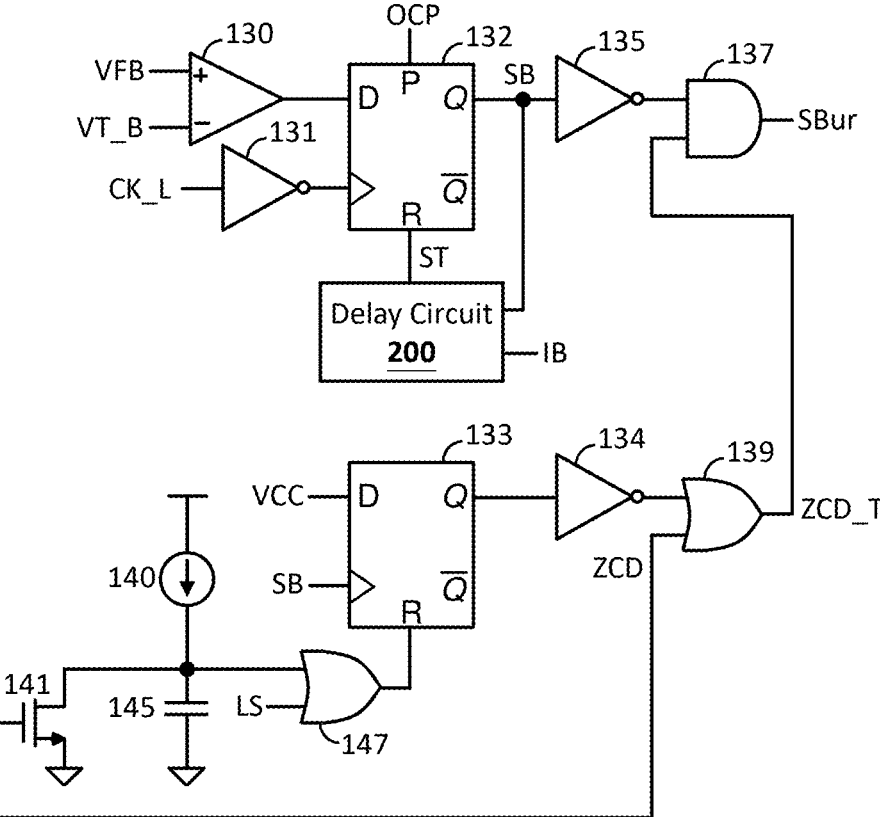
FIG. 16 shows a schematic diagram of a portion of a PWM control circuit for generating the burst period signal according to an embodiment of the present invention.

FIG. 16 shows a schematic diagram of a portion of a PWM control circuit for generating the burst period signal according to an embodiment of the present invention. In one embodiment, during a burst OFF period, both the high-side driving signal HS and the low-side driving signal LS are turned off when the feedback signal VFB drops below a low-power threshold VT_B. This comparison is implemented by a comparator 130. The burst OFF period begins in synchronization with the deactivation (OFF state, e.g., 0) of the high-side driving signal HS, and ends in synchronization with the activation (ON state, e.g., 1) of the low-side driving signal LS. The deactivation of the high-side driving signal HS is triggered by the enablement of the first dead-time signal CK_L, which is connected to an inverter 131, activating a flip-flop 132 to generate the burst signal SB when the feedback signal VFB falls below the low-power threshold VT_B. Following the generation of the burst signal SB, a delay circuit 200 determines a delay period, which the burst OFF period includes, before it deactivates the flip-flop 132 and the burst signal SB. The delay circuit 200 ensures a lower limit of the delay period when the burst signal SB is generated.

In one embodiment, the duration of the burst OFF period increases proportionally with the decrease of the output power level of the output voltage VOUT. Furthermore, the over-current signal OCP is utilized to preset the flip-flop 132 and to generate the burst signal SB in response to an over-current situation. Subsequently, the burst signal SB is used to generate the burst period signal SBur through an inverter 135.

As shown in FIG. 16, in one embodiment, to synchronize with the end of the burst OFF period, an AND gate 137 is employed in conjunction with the zero-current signal ZCD. A flip-flop 133, an inverter 134, and an OR gate 139 are configured to generate a signal ZCD_T, signifying synchronization with the zero-current signal ZCD during the timeout period. A transistor 141 is connected to discharge a capacitor 145 when the zero-current signal ZCD is generated. During instances where the zero-current signal ZCD cannot be generated, for example when the quasi-resonance has been fully damped before the end of the burst OFF period, the timeout period generated by a current source 140 charging the capacitor 145 will disable the synchronization between the with the zero-current signal ZCD and the burst period signal SBur. More specifically, the enabling of the low-side driving signal LS through NOR gate 147 resets the flip-flop 133, so as to disable synchronization with the zero-current signal ZCD for the burst period signal SBur.

Figure 17:
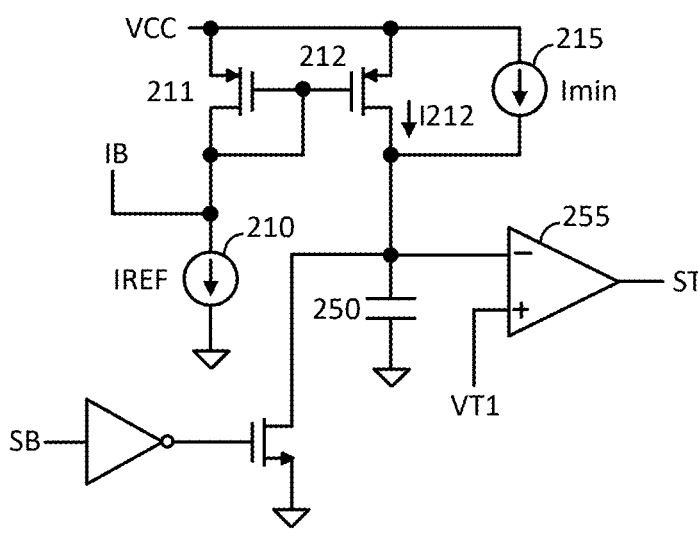
FIG. 17 shows a schematic diagram of the delay circuit in FIG. 16 according to an embodiment of the present invention.

Referring to FIGS. 16 and 17. FIG. 17 shows a schematic diagram of a specific embodiment of the delay circuit 200 in FIG. 16. In one embodiment, the delay period is determined by a current I212 through a transistor 212 and the capacitance of a capacitor 250. When the capacitor 250 is charged beyond a threshold VT1, an output signal ST of a comparator 255 will reset flip-flop 132. The current IB increases in response to a decrease in output power, as indicated by the feedback signal VFB falling below the reference voltage VTC. The current I212 can be expressed as:

$$I212 = n \times (IREF - IB)$$

In the above equation, n represents the current-mirror ratio of the transistors 211 and 212. Consequently, as the current IB increases, the current I212 decreases, and leading to an increase in the burst OFF period of the burst period signal SBur when the output power decreases. A current IREF of a current source 210 is configured to determine the lower limit of the delay period for delay circuit 200, while a current Imin of a current source 215 is configured to determine the upper limit of the delay period of the delay circuit 200. Therefore, the burst period signal SBur is limited between the lower limit and the upper limit of the delay period.

Figure 18A:
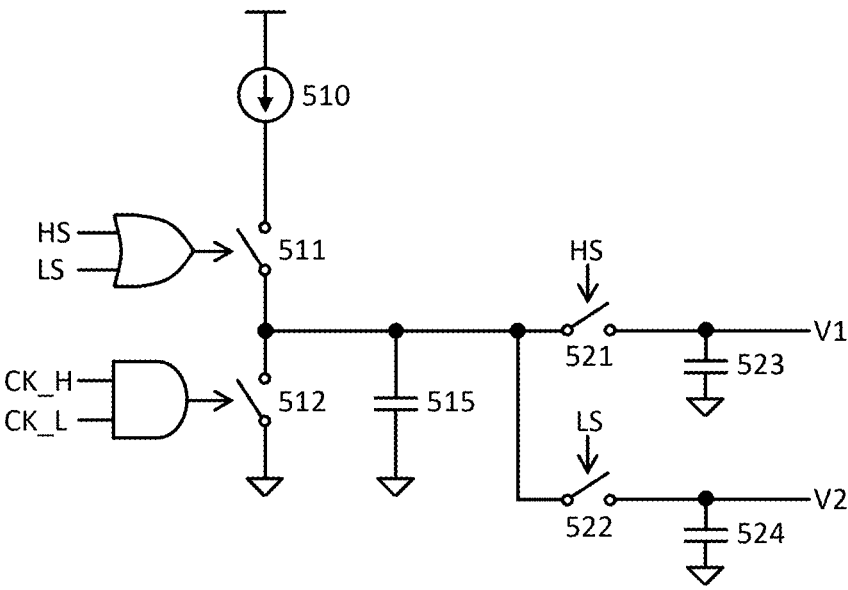
FIGS. 18A and 18B shows schematic diagrams of the auto-tuning circuit in FIG. 10 according to an embodiment of the present invention.
Figure 18B:
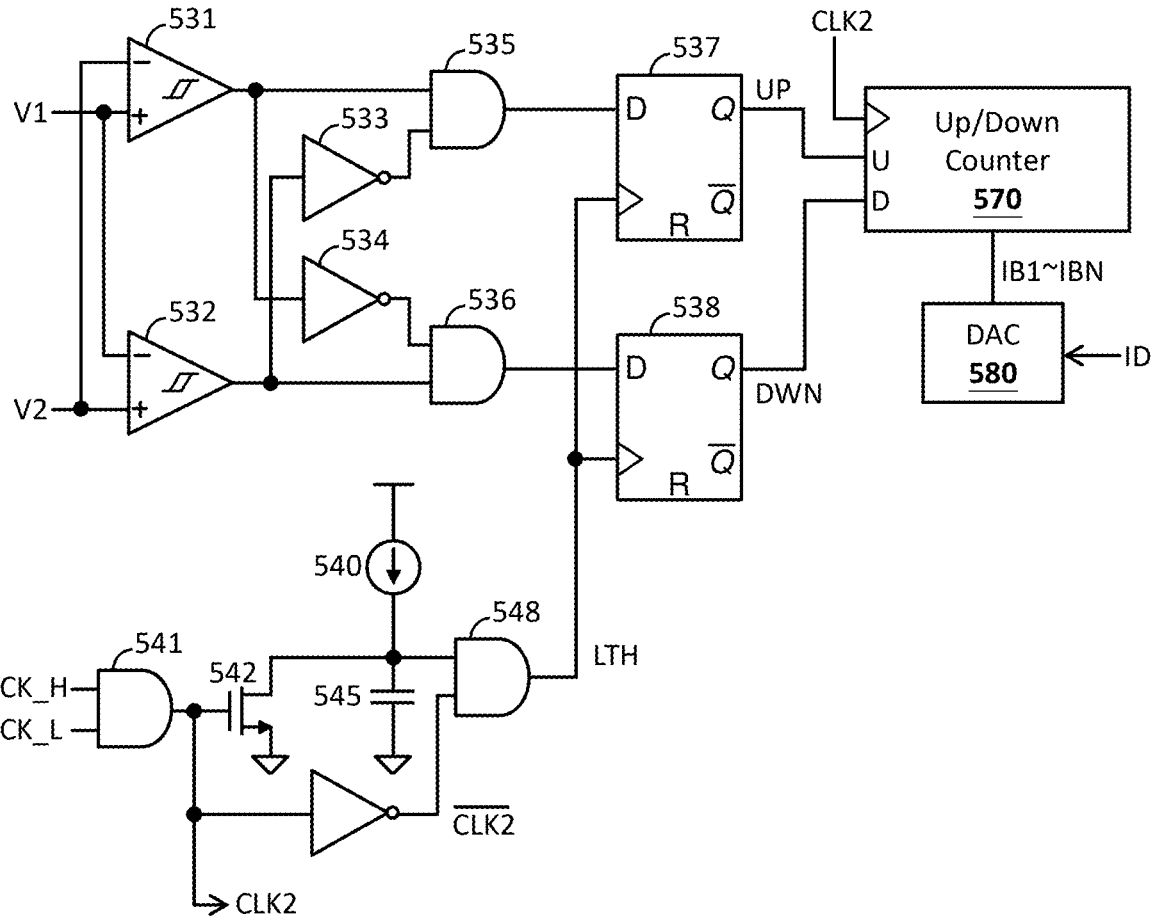

FIGS. 18A and 18B shows schematic diagrams of the auto-tuning circuit in FIG. 10 according to an embodiment of the present invention. FIG. 18A represents a time-to-voltage converter. In one embodiment, during the turn-on period of the high-side driving signal HS, a current source 510 is configured to operably charge capacitors 515 and 523 through switches 511 and 521. When the high-side driving signal HS is turned off, capacitor 523 will retain a voltage V1 until the high-side driving signal HS is turned on again. The level of voltage V1 is related to the pulse width of the high-side driving signal HS. During the turn-on period of the low-side driving signal LS, the current source 510 is configured to operably charge capacitors 515 and 524 through switches 511 and 522. When the low-side driving signal LS is turned off, capacitor 524 will retain a voltage V2 until the low-side driving signal LS is turned on again. The level of voltage V2 is related to the pulse width of the low-side driving signal LS. The capacitor 515 is discharged by a switch 512 when the first dead-time signal CK_L or the second dead-time signal CK_H is generated. In one embodiment, the capacitance of capacitor 515 is significantly higher than that of capacitors 523 and 524.

As shown in FIG. 18B, in one embodiment, comparators 531 and 532, inverters 533 and 534, AND gates 535 and 536, and flip-flops 537 and 538 are configured as a comparison circuit to compare the voltage V1 and V2, thereby generating both an up signal UP and a down signal DWN for an up/down counter 570. In one embodiment, a current source 540, AND gates 541 and 548, a transistor 542, and a capacitor 545 are configured as a delay-time circuit to generate a latch signal LTH after a specified delay when the first dead-time signal CK_L or the second dead-time signal CK_H is generated. The latch signal LTH is used to latch the state of flip-flops 537 and 538. In one embodiment, the flip-flop 537 is configured to generate the up signal UP for up-counting, and the flip-flop 538 is configured to generate the down signal DWN for down-counting. The up/down counter 570 is clocked by the first dead-time signal CK_L and/or the second dead-time signal CK_H. In one embodiment, as shown in FIG. 18B, the up/down counter 570 is clocked by a clock signal CLK2 which is an AND logic result of the first dead-time signal CK_L and the second dead-time signal CK_H. Note that the first dead-time signal CK_L and the second dead-time signal CK_H are both low true signal, therefore the clock signal CLK2 (or more precisely the inversed clock signal \x\to(CLK2)) represents timing trigged by the first dead-time signal CK_L or the second dead-time signal CK_H. The output of the up/down counter 570 is connected to a digital-to-analog converter 580 to generate the current ID for offset signal VOS adjustment.

Still referring to FIGS. 18A and 18B along with FIG. 10, from a broader view point, the voltages V1 and V2 are related to the duty cycle of the high-side driving signal HS and the low-side driving signal LS respectively. The voltages V1 and V2 are compared to generate the tuning current ID which is related the difference of the voltage V1 and V2. The tuning ID is employed to adjust the offset voltage VOS (FIG. 10), thereby balancing the duty cycle of the high-side driving signal HS and the low-side driving signal LS.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A conversion control circuit configured to operably control a resonant power converter, wherein the resonant power converter includes a high-side transistor and a low-side transistor which are coupled in series sequentially between an input voltage and a ground potential to form a half-bridge circuit, and a resonant circuit including at least one resonant inductor and a resonant capacitor, wherein the high-side transistor and the low-side transistor are configured to switch the resonant circuit to convert the input voltage into an output voltage; wherein the conversion control circuit comprises:

a sensing circuit configured to sense a resonant-related parameter with a resonant state to generate a sensed signal, wherein the resonant-related parameter related to the resonance produced by the resonant circuit; and a PWM control circuit configured to operably generate a high-side driving signal and a low-side driving signal according to the sensed signal and a feedback signal, so as to control the high-side transistor and the low-side transistor respectively for switching the resonant circuit to generate the output voltage; wherein the feedback signal is related to an output power of the output voltage;

wherein when the feedback signal falls below a low-power threshold, the resonant power converter enters a burst OFF period, during which both the high-side transistor and the low-side transistor are turned OFF;

wherein the burst OFF period is equal to or greater than an ON period of the high-side driving signal plus an ON period of the low-side driving signal.

2. The conversion control circuit of claim 1, wherein the resonant power converter additionally enters the burst OFF period when a current-sense signal, which is related to the sensed signal, exceeds an over-current threshold.

3. The conversion control circuit of claim 1, wherein the resonant-related parameter includes one of the following:

(1) a resonant voltage across the resonant capacitor; or (2) a resonant current flowing through the resonant capacitor or flowing through the at least one resonant inductor.

4. The conversion control circuit of claim 3, wherein the sensing circuit includes one of the following:

(1) a differentiator circuit coupled to the resonant capacitor and configured to generate the resonant current; or (2) a DCR sensing circuit connected in parallel to one of the at least one resonant inductor and configured to generate the resonant current.

5. The conversion control circuit of claim 1, wherein the burst OFF period starts with a synchronization of the high-side transistor transitioning to a non-conductive state, and the burst OFF period ends with a synchronization of the low-side transistor transitioning to a conductive state.

6. The conversion control circuit of claim 5, wherein the burst OFF period further ends with a synchronization of a zero current point of a current-sense signal, thereby mitigating the conduction loss when the low-side transistor is turning ON; wherein the current-sense signal is related to the sensed signal;

wherein when the burst OFF period ends with a synchronization of the zero current point of a current-sense signal, the burst OFF period is equal to or greater than a quasi-resonance period which is related to the synchronization of the zero current point of a current-sense signal.

7. The conversion control circuit of claim 6, wherein when the burst OFF period exceeds a timeout period threshold, the burst OFF period ends with an asynchronization of the zero current point of the current-sense signal.

8. The conversion control circuit of claim 1, wherein a duration of the burst OFF period increases as an output power of the output voltage decreases.

9. The conversion control circuit of claim 1, wherein the PWM control circuit includes:

a soft-start circuit configured to enable a soft-start power-on sequence, during which the feedback signal progressively increases;

wherein the PWM control circuit is configured to operably generate the high-side driving signal and the low-side driving signal further according to the sensed signal and a compensation signal, wherein the compensation signal is generated by subtracting a ramp signal from the feedback signal.

10. The conversion control circuit of claim 1, further comprising a full-wave rectification circuit configured to operably offset a DC component of the sensed signal according to an offset signal, and to operably generate a rectification sensed signal by performing a full-wave rectification on the sensed signal;

wherein the PWM control circuit is configured to operably generate the high-side driving signal and the low-side driving signal further according to a comparison between the rectification sensed signal and a compensation signal, wherein the compensation signal is related to the feedback signal.

11. The conversion control circuit of claim 10, wherein the full-wave rectification circuit is further configured to operably adjust a DC bias of the rectification sensed signal according to the offset signal.

12. The conversion control circuit of claim 10, wherein the offset signal is adjusted based on a difference between a duty cycle of the high-side driving signal and a duty cycle of the low-side driving signal, so as to adjust and match the duty cycle of the high-side driving signal and the duty cycle of the low-side driving signal.

13. The conversion control circuit of claim 10, wherein the offset signal includes a bias voltage, which is generated by a resistive voltage divider connected to the input voltage.

14. The conversion control circuit of claim 1, further comprising a tuning circuit configured to adjust a duty cycle of the high-side driving signal to match a duty cycle of the low-side driving signal, or to adjust the duty cycle of the low-side driving signal to match the duty cycle of the high-side driving signal.

15. The conversion control circuit of claim 10, wherein the PWM control circuit further configured to generate a phase signal, which is set and enabled in response to a crossover signal, wherein the crossover signal is generated when the rectification sensed signal falls below a low-voltage threshold;

wherein the phase signal is reset and disabled when the rectification sensed signal exceeds the compensation signal.

16. The conversion control circuit of claim 15, wherein when the high-side driving signal is turned on and the phase signal is enabled, the high-side driving signal is turned off if the rectification sensed signal crosses the compensation signal, and after a first dead-time, the low-side driving signal is turned on;

wherein when the low-side driving signal is turned on and the phase signal is enabled, the low-side driving signal is turned off if the rectification sensed signal crosses the compensation signal, and after a second dead-time, the high-side driving signal is turned on.

17. The conversion control circuit of claim 1, wherein the pulse width of the high-side driving signal and the low-side driving signal is limited by a maximum on-time, so as to constrains a switching-cycle time to be shorter than a resonant period of the resonant circuit, wherein the switching-cycle time includes an ON period and an OFF period of the high-side driving signal or of the low-side driving signal.

18. The conversion control circuit of claim 17, wherein when the input voltage is lower than a low-voltage threshold and the output power is higher than a heavy-load threshold, the maximum on-time is lengthened, such that a switching-cycle time is optionally longer than a resonant period of the resonant circuit, wherein the switching-cycle time includes an ON period and an OFF period of the high-side driving signal or of the low-side driving signal.

19. A conversion control circuit configured to operably control a resonant power converter, wherein the resonant power converter includes a high-side transistor and a low-side transistor which are coupled in series sequentially between an input voltage and a ground potential to form a half-bridge circuit, and a resonant circuit including at least one resonant inductor and a resonant capacitor, wherein the high-side transistor and the low-side transistor are configured to switch the resonant circuit to convert the input voltage into an output voltage; wherein the conversion control circuit comprises:

a sensing circuit configured to sense a resonant-related parameter with a resonant state to generate a sensed signal, wherein the resonant-related parameter is related to the resonance produced by the resonant circuit;

a PWM control circuit configured to operably generate a high-side driving signal and a low-side driving signal according to the sensed signal and a feedback signal, so as to control the high-side transistor and the low-side transistor respectively for switching the resonant circuit to generate the output voltage; wherein the feedback signal is related to an output power of the output voltage; and a full-wave rectification circuit configured to operably offset a DC component of the sensed signal according to an offset signal, and to operably generate a rectification sensed signal by performing a full-wave rectification on the sensed signal;

wherein the PWM control circuit is configured to operably generate the high-side driving signal and the low-side driving signal further according to a comparison between the rectification sensed signal and a compensation signal, wherein the compensation signal is related to the feedback signal.

20. The conversion control circuit of claim 19, wherein the full-wave rectification circuit is further configured to operably adjust a DC bias of the rectification sensed signal according to the offset signal.

21. The conversion control circuit of claim 19, wherein the offset signal is adjusted based on a difference between a duty cycle of the high-side driving signal and a duty cycle of the low-side driving signal, so as to adjust and match the duty cycle of the high-side driving signal and the duty cycle of the low-side driving signal.

22. A control method configured to operably control a resonant power converter, wherein the resonant power converter includes a high-side transistor and a low-side transistor which are coupled in series sequentially between an input voltage and a ground potential to form a half-bridge circuit, and a resonant circuit including at least one resonant inductor and a resonant capacitor, wherein the high-side transistor and the low-side transistor are configured to switch the resonant circuit to convert the input voltage into an output voltage; wherein the control method comprises:

sensing a resonant-related parameter with a resonant state to generate a sensed signal, wherein the resonant-related parameter is related to the resonance produced by the resonant circuit;

generating a high-side driving signal and a low-side driving signal according to the sensed signal and a feedback signal, so as to control the high-side transistor and the low-side transistor respectively for switching the resonant circuit to generate the output voltage; wherein the feedback signal is related to an output power of the output voltage; and rendering the resonant power converter to enter a burst OFF period when the feedback signal falls below a low-power threshold, wherein both the high-side transistor and the low-side transistor are turned OFF during the burst OFF period;

wherein a the burst OFF period is equal to or greater than an ON time of the high-side driving signal plus an ON time of the low-side driving signal.

23. The control method of claim 22, wherein the resonant-related parameter includes one of the following:

(1) a resonant voltage across the resonant capacitor; or (2) a resonant current flowing through the resonant capacitor or flowing through the at least one resonant inductor.

24. The control method of claim 22, wherein the step of rendering the resonant power converter to enter a burst OFF period includes:

controlling the burst OFF period to start with a synchronization of the high-side transistor transitioning to a non-conductive state; and controlling the burst OFF period to end with a synchronization of the low-side transistor transitioning to a conductive state.

25. The control method of claim 22, further comprising: rendering a duration of the burst OFF period to increase as an output power of the output voltage decreases.

26. The control method of claim 22, further comprising: generating a rectification sensed signal, which includes:

offsetting a DC component of the sensed signal according to an offset signal; and performing a full-wave rectification on the sensed signal to generate the rectification sensed signal;

wherein the step of generating the high-side driving signal and the low-side driving signal further according to a comparison between a rectification sensed signal and a compensation signal, wherein the compensation signal is related to the feedback signal.

27. The control method of claim 26, wherein the step of generating the rectification sensed signal further includes:

adjusting a DC bias of the rectification sensed signal according to the offset signal.

28. The control method of claim 26, wherein the step of generating the rectification sensed signal further includes:

adjusting the offset signal based on a difference between a duty cycle of the high-side driving signal and a duty cycle of the low-side driving signal, so as to adjust and match the duty cycle of the high-side driving signal and the duty cycle of the low-side driving signal.

29. A control method configured to operably control a resonant power converter, wherein the resonant power converter includes a high-side transistor and a low-side transistor which are coupled in series sequentially between an input voltage and a ground potential to form a half-bridge circuit, and a resonant circuit including at least one resonant inductor and a resonant capacitor, wherein the high-side transistor and the low-side transistor are configured to switch the resonant circuit to convert the input voltage into an output voltage; wherein the control method comprises:

sensing a resonant-related parameter with a resonant state to generate a sensed signal, wherein the resonant-related parameter is related to the resonance produced by the resonant circuit;

generating a high-side driving signal and a low-side driving signal according to the sensed signal and a feedback signal, so as to control the high-side transistor and the low-side transistor respectively for switching the resonant circuit to generate the output voltage; wherein the feedback signal is related to an output power of the output voltage;

generating a rectification sensed signal, which includes:

offsetting a DC component of the sensed signal according to an offset signal; and performing a full-wave rectification on the sensed signal to generate the rectification sensed signal;

wherein the step of generating the high-side driving signal and the low-side driving signal further according to a comparison between a rectification sensed signal and a compensation signal, wherein the compensation signal is related to the feedback signal.

30. The control method of claim 29, wherein the step of generating the rectification sensed signal further includes:

adjusting a DC bias of the rectification sensed signal according to the offset signal.

31. The control method of claim 29, wherein the step of generating the rectification sensed signal further includes:

adjusting the offset signal based on a difference between a duty cycle of the high-side driving signal and a duty cycle of the low-side driving signal, so as to adjust and match the duty cycle of the high-side driving signal and the duty cycle of the low-side driving signal.

* * * * *